US012687116B1

(12) United States Patent
Sibbach et al.

(10) Patent No.: US 12,687,116 B1
(45) Date of Patent: Jul. 21, 2026

(54) ROTATABLE TRUNNIONS FOR VARIABLE PITCH BLADES

(71) Applicant: General Electric Company, Evendale, OH (US)

(72) Inventors: Arthur W. Sibbach, Boxford, MA (US); Nicholas Joseph Kray, Mason, OH (US); Steven M. Taylor, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/224,319

(22) Filed: May 30, 2025

(51) Int. Cl.
| *F01D 7/00* | (2006.01) |
| *F03D 7/02* | (2006.01) |
| *F04D 29/32* | (2006.01) |
| *F04D 29/34* | (2006.01) |
| *F04D 29/36* | (2006.01) |
| *F16C 11/02* | (2006.01) |

(52) U.S. Cl.
CPC ............. *F01D 7/00* (2013.01); *F03D 7/0224* (2013.01); *F04D 29/323* (2013.01); *F04D 29/34* (2013.01); *F04D 29/36* (2013.01); *F16C 11/02* (2013.01); *F05D 2260/70* (2013.01)

(58) Field of Classification Search
CPC ........ F01D 7/00; F03D 7/0224; F04D 29/323; F04D 29/34; F04D 29/36; F16C 11/02; F05D 2260/70
See application file for complete search history.

(56) References Cited

U.S. PATENT DOCUMENTS

| 3,720,060 | A | 3/1973 | Davies et al. |
| 3,752,600 | A | 8/1973 | Walsh et al. |
| 4,512,718 | A | 4/1985 | Stargardter |
| 4,762,466 | A | 8/1988 | Bouiller et al. |
| 4,884,948 | A | 12/1989 | Sikorski |
| 4,892,462 | A | 1/1990 | Barbier et al. |
| 5,022,825 | A | 6/1991 | Violette et al. |
| 5,720,597 | A | 2/1998 | Wang et al. |

(Continued)

FOREIGN PATENT DOCUMENTS

| CN | 112937837 A | 6/2021 |
| FR | 2992678 A1 | 1/2014 |

(Continued)

*Primary Examiner* — Andrew J Marien
(74) *Attorney, Agent, or Firm* — Hanley, Flight & Zimmerman, LLC

(57) ABSTRACT

Rotatable trunnions for variable pitch blades are disclosed herein. An variable pitch blade assembly comprises a trunnion defining a pitch axis, the trunnion including: a first sleeve defining a face of the trunnion; and a second sleeve within the first sleeve, the second sleeve including a pedestal and a column extending from the pedestal; a first spar for a fan blade, the first spar having a base portion and a mounting portion, the mounting portion protruding from the face of the trunnion, the base portion including an inner surface defining a bore, wherein the column of the second sleeve is disposed within the bore of the base portion, wherein the first sleeve, the second sleeve, and the first spar are coaxial with the pitch axis; and a second spar extending from the face of the trunnion, the second spar laterally offset relative to the first spar.

17 Claims, 11 Drawing Sheets

(56)  References Cited

U.S. PATENT DOCUMENTS

| | | | |
|---|---|---|---|
| 6,676,080 | B2 * | 1/2004 | Violette .................. B64C 11/04 |
| | | | 416/204 R |
| 7,422,419 | B2 | 9/2008 | Carvalho |
| 8,123,471 | B2 | 2/2012 | Mielke et al. |
| 9,068,574 | B2 | 6/2015 | Boston et al. |
| 9,849,969 | B2 * | 12/2017 | Nagle ..................... B64C 11/06 |
| 9,884,675 | B2 | 2/2018 | Curlier et al. |
| 10,100,653 | B2 | 10/2018 | Niergarth et al. |
| 10,221,706 | B2 | 3/2019 | Niergarth et al. |
| 10,287,902 | B2 | 5/2019 | Sak et al. |
| 10,364,020 | B2 | 7/2019 | Curnock et al. |
| 10,408,227 | B2 | 9/2019 | Bailey et al. |
| 10,549,842 | B2 * | 2/2020 | Andrzejewski ......... B64C 11/26 |
| 10,774,660 | B2 | 9/2020 | Luczak |
| 11,066,958 | B2 | 7/2021 | Karafillis et al. |
| 11,118,464 | B2 | 9/2021 | Perez |
| 11,339,727 | B2 | 5/2022 | Phelps et al. |
| 11,401,824 | B2 * | 8/2022 | Breeze-Stringfellow .................... |
| | | | F02K 5/00 |
| 11,846,192 | B1 | 12/2023 | Xie et al. |
| 11,913,408 | B1 | 2/2024 | Daggett et al. |
| 11,982,205 | B1 * | 5/2024 | Jain ........................ F01D 25/246 |
| 12,078,072 | B2 | 9/2024 | Levisse et al. |
| 12,078,080 | B1 * | 9/2024 | Xie ........................ F04D 29/322 |
| 12,091,986 | B2 * | 9/2024 | Joudon ................... B29C 70/86 |
| 2010/0322775 | A1 | 12/2010 | Sürken |
| 2014/0219807 | A1 | 8/2014 | Lattanzio et al. |
| 2017/0002661 | A1 | 1/2017 | Opderbecke et al. |
| 2018/0335051 | A1 | 11/2018 | Lurie et al. |
| 2018/0340447 | A1 | 11/2018 | Karafillis et al. |
| 2020/0362713 | A1 | 11/2020 | Bertini |
| 2021/0108518 | A1 | 4/2021 | Kray |
| 2021/0222575 | A1 | 7/2021 | Breeze-Stringfellow et al. |
| 2023/0013057 | A1 | 1/2023 | Millier et al. |
| 2023/0079110 | A1 | 3/2023 | Lima |
| 2024/0044253 | A1 | 2/2024 | Kray et al. |
| 2024/0384657 | A1 * | 11/2024 | Kray ........................ F01D 7/00 |

FOREIGN PATENT DOCUMENTS

| | | |
|---|---|---|
| GB | 220013 A | 8/1924 |
| WO | 2015069344 A1 | 5/2015 |

* cited by examiner

ROTATABLE TRUNNIONS FOR VARIABLE PITCH BLADES

FIELD OF THE DISCLOSURE

This disclosure relates generally to gas turbine engines and, more particularly, to rotatable trunnions for variable pitch blades.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section, thereby creating combustion gases. The combustion gases flow from the combustion section through a hot gas path defined within the turbine section and then exit the turbine section via the exhaust section.

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

Figure 1:
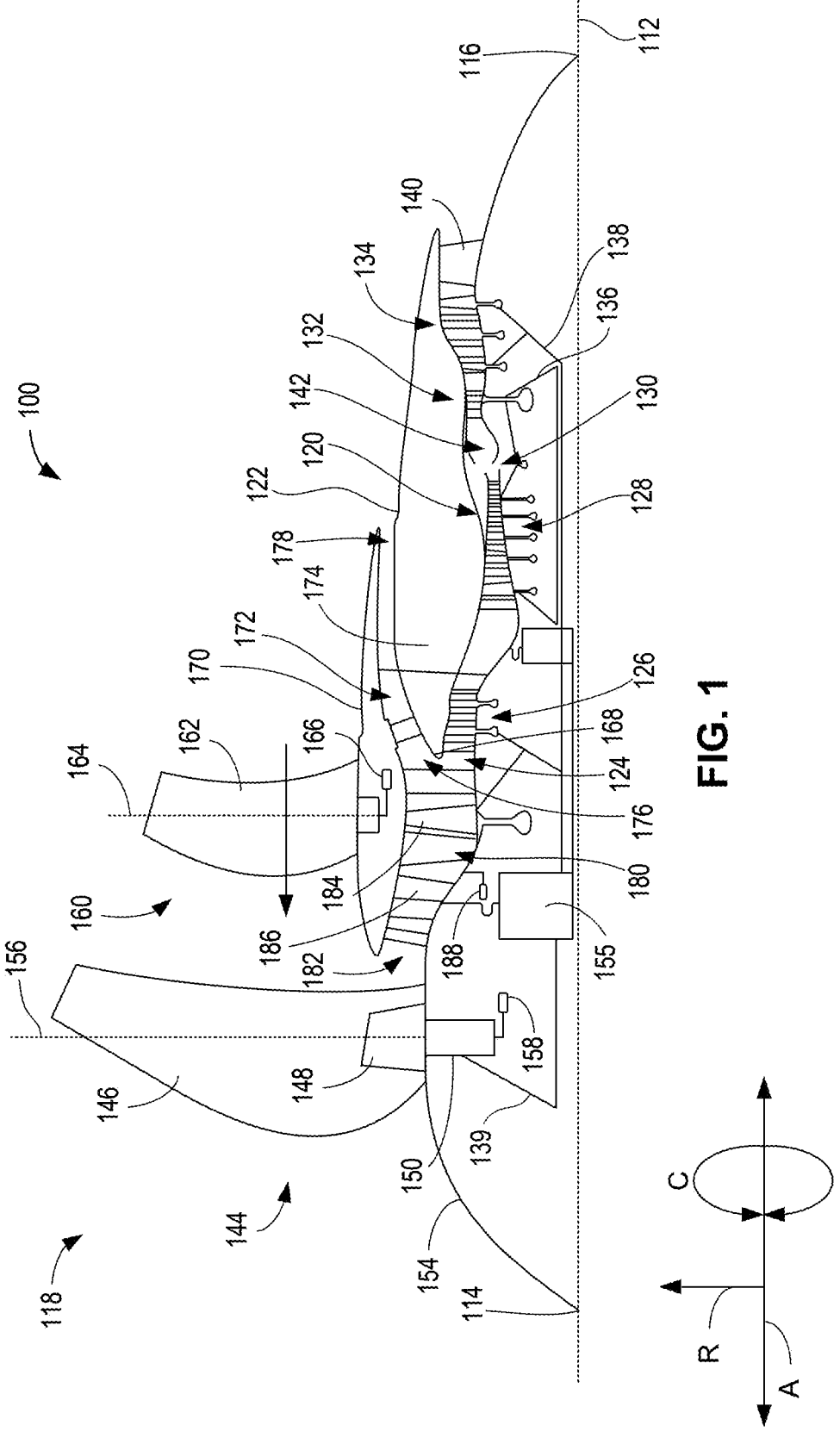
FIG. 1 is a schematic cross-sectional view of an example gas turbine engine in which examples disclosed herein may be implemented.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized.

The following detailed description is, therefore, provided to describe example implementations and not to be taken limiting on the scope of the subject matter described in this disclosure. Certain features from different aspects of the following description may be combined to form yet new aspects of the subject matter discussed below.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

In some examples used herein, the term "substantially" is used to describe a relationship between two parts that is within five degrees of the stated relationship. As used herein, "substantially parallel" means perfectly parallel or within +/−5 degrees of perfectly parallel. As used herein, "substantially perpendicular" means perfectly perpendicular or within +/−5 degrees of perfectly perpendicular.

The terms "upstream" and "downstream" refer to the relative direction with respect to fluid flow in a fluid pathway. For example, "upstream" refers to the direction from which the fluid flows, and "downstream" refers to the direction to which the fluid flows. For example, with regard to a gas turbine engine, an engine inlet is said to be upstream of an engine outlet, and the engine outlet is said to be downstream of the engine inlet.

The terms "forward" and "aft" refer to relative positions within a gas turbine engine or vehicle, and refer to the normal operational attitude of the gas turbine engine or vehicle. More particularly, forward and aft are used herein with reference to a direction of travel and a direction of propulsive thrust of the gas turbine engine or vehicle.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein.

An axial axis refers to an axis that is generally parallel to a first axis of rotation about which components of the gas turbine engine rotate. The first axis of rotation is generally aligned with an engine centerline. As used herein, "axial," "axially," or "axial direction" refers to a location or direction with respect to the axial axis.

A radial axis refers to an axis that extends perpendicular to the axial axis and is aligned with a height dimension of a blade assembly. As used herein, "radial," "radially," or "radial direction" refers to a location or direction with respect to the radial axis.

A pitch axis refers to a second axis of rotation about which a blade assembly rotates.

The terms "inner" and "outer" are defined relative to an axis of rotation. For example, an inner element (e.g., surface, component, part, etc.) is closer to the axis of rotation than an outer element (e.g., surface, component, part, etc.).

A turbine engine, also referred to herein as a gas turbine engine, is a type of internal combustion engine that uses air as a moving fluid. The turbine engine generally includes a fan and a core or core turbine engine (e.g., a turbomachine) located downstream from the fan. In operation, atmospheric air enters the gas turbine engine via the fan and enters the core turbine engine, which is operable to generate a flow of hot, pressurized, combustion gases to operate the gas turbine engine as well as to perform useful work, such as providing propulsive thrust or mechanical work. The fan may be tasked with moving sufficient amounts of atmospheric air to produce (e.g., high) levels of thrust for operation of an aircraft.

Certain gas turbine engines include a reduced number of fan blades, which rotate at a reduced speed to limit a fan pressure ratio of the fan. As used herein, the term "fan pressure ratio" as it relates to a plurality of blades of a fan refers to a ratio of an air pressure immediately downstream of the blades during operation of the fan to an air pressure immediately upstream of the blades of the fan during operation of the fan. In particular, as the pressure ratio of the fan increases, the fan typically needs to rotate at a higher speed to prevent or limit instances of stall. Because the fan is powered by the core turbine engine, increasing the rotational speed of the fan can adversely affect engine performance by utilizing additional power. Accordingly, it is typically desirable to limit the fan pressure ratio to reduce the speed of the fan while still moving a relatively large mass of air (e.g., for a given thrust output). However, the reduced speed and blade count of the fan can result in a less than desirable amount of air flow at an inner periphery of the fan blades (e.g., at a hub) at least in part due to a reduced solidity at the hub. The term "solidity" (e.g., blade solidity) as used herein in relation to a blade assembly refers to a ratio of chord length (e.g., a chord length of the blades) to spacing (e.g., spacing of the blades). In some examples, the spacing is based on a number of the blades in the blade assembly and a radial length of the blades. The chord length refers to a straight-line measurement between a leading edge and a trailing edge of a blade.

Additionally, the reduced speed, blade count, and solidity of the fan can increase a risk of debris ingestion into the core of the gas turbine engine, which can adversely affect engine performance and reliability, damage components of the gas turbine engine, and increase the frequency of repair and maintenance required for the engine. The term "debris" (also referred to herein a "foreign object debris" ("FOD")) as used herein is any object, particle, or body within atmospheric air that can pass through the fan of a gas turbine engine. The fan is typically structured to break up and centrifugally debris that passes therethrough during operation of the gas turbine engine. However, the lower blade count, lower solidity, and reduced speed of the fan can allow more debris to enter the core due to reduced slicing and reduced centrifugal pumping of the debris.

Positioning splitter blades between the fan blades can provide aerodynamic benefits as well as reduce or limit ingestion of debris into the core of the gas turbine engine. The term "splitter blade" as used herein refers to a blade of a gas turbine engine having a partial span (e.g., a span that is shorter than a full span of a corresponding primary blade (e.g., a rotor blade, such as a fan blade, and/or a stator vane, such as an inlet guide vane, etc.)). The splitter blades can be mounted with the fan blades to increase the pumping of air near roots of the blades. Moreover, the splitter blades facilitate increased localized slicing of the debris that enters the fan (e.g., near the hub). Further, the splitter blades provide for increased localized solidity of the fan that helps to centrifugally pump the debris that passes through the fan at low span locations radially outward to a higher radius and into the bypass airflow.

Examples disclosed herein enable mounting of one or more splitter blades to a trunnion along with a primary blade. Certain examples disclosed herein enable manufacture of a rotatable trunnion for mounting a root of a variable pitch fan blade and one or more corresponding splitter blades such that the fan blade and the splitter blade can rotate (e.g., pitch) in unison. By maintaining the primary blade and the one or more splitter blades in pitch-wise alignment, example trunnions disclosed herein can be used to prevent or limit instances of stall. For example, misalignment in a pitch angle of a primary blade and a corresponding splitter blade can result in airflow detachment from the primary blade and/or the corresponding splitter blade, resulting in abnormal flow through the fan that can lead to stall.

Example trunnions disclosed herein include a primary or main spar that is couplable to a primary blade to mount the primary blade to the trunnion. Certain example trunnions disclosed herein include one or more splitter spars configured to mount one or more splitter blades to the trunnions. Certain example trunnions disclosed herein include one or more splitter blades extending directly from the trunnions. Certain example trunnions disclosed herein include one or more dovetail slots configured to mount one or more splitter blades to the trunnions via dovetails.

Examples disclosed herein are directed to rotatable trunnions for variable pitch blades. For purposes of illustration, the present disclosure will be described with respect to a fan of a gas turbine engine. More specifically, the disclosure is directed to a rotatable trunnion configured to couple a fan blade and one or more splitter blades to a rotor of the gas turbine engine. It will be understood, however, that aspects of the disclosure described herein are not so limited and may have general applicability within an engine, including compressors, inlet channels, etc., as well as in non-aircraft applications, such as other mobile applications and non-mobile industrial, commercial, and residential applications. Further still, aspects of the present disclosure can be applicable to other engines, such as hybrid gas turbine engines, electric engines or electric propulsion engines (e.g., engines having an electric motor to drive a propeller/fan, etc. As used herein, a hybrid gas turbine engine is an assembly with a propeller/fan driven by an electric motor in a conventional gas turbine engine.

Referring now to the drawings, wherein identical numerals indicate the same elements throughout the figures, FIG. 1 is a schematic cross-sectional view of an example open-rotor-type gas turbine engine 100. Particularly, FIG. 1 illustrates an aviation three-stream turbine engine ("turbine engine 100"). The turbine engine 100 of FIG. 1 can be mounted to an aerial vehicle, such as a fixed-wing aircraft, and can produce thrust for propulsion of the aerial vehicle.

The architecture of the turbine engine 100 provides three distinct streams of thrust-producing airflow during operation. The turbine engine 100 of FIG. 1 includes a fan that is not ducted by a nacelle or cowl, such that it may be referred to herein as an "unducted fan," or the entire gas turbine engine 100 may be referred to as an "unducted engine" or an "open rotor engine".

As shown in FIG. 1, the turbine engine 100 defines an axial centerline axis 112 (e.g., an engine centerline) extending therethrough for reference. In this example, the axial centerline axis 112 is a first axis of rotation about which rotating components of the turbine engine 100 rotate. FIG. 1 also includes an annotated directional diagram with reference to an axial direction A, a radial direction R, and a circumferential direction C. As illustrated in FIG. 1, the axial direction A extends generally parallel to the axial centerline axis 112 and the radial direction R extends orthogonally relative to the axial centerline axis 112. The circumferential direction C is a direction that extends concentrically around the axial centerline axis 112. The turbine engine 100 extends between a forward end 114 and an aft end 116 (e.g., along the axial direction A).

The turbine engine 100 includes a core turbine or gas turbine engine 120 ("core turbine engine 120") disposed downstream from a fan section 118. Generally, the core turbine engine 120 includes, in serial flow order, a compressor section, a combustion section, a turbine section, and an exhaust section. Particularly, as shown in FIG. 1, the core turbine engine 120 includes a core cowl 122 that defines an annular core inlet 124. The core cowl 122 further encloses a low-pressure system and a high-pressure system. In certain examples, the core cowl 122 may enclose and support a booster or low-pressure ("LP") compressor 126 for pressurizing the air that enters the core turbine engine 120 through the core inlet 124. A high-pressure ("HP"), multi-stage, axial-flow compressor 128 receives pressurized air from the LP compressor 126 and further increases the pressure of the air. The pressurized air stream flows downstream to a combustor 130 where fuel is injected into the pressurized air stream and ignited to raise the temperature and energy level of the pressurized air. It will be appreciated that as used herein, the terms "high/low speed" and "high/low-pressure" are used with respect to the high-pressure/high speed system and low-pressure/low speed system interchangeably. Further, it will be appreciated that the terms "high" and "low" are used in this same context to distinguish the two systems and are not meant to imply any absolute speed or pressure values.

The high energy combustion products flow from the combustor 130 downstream to a high-pressure turbine 132 ("HP turbine 132"). The HP turbine 132 drives the HP compressor 128 through a high-pressure shaft 136 ("HP turbine 136"). In this regard, the HP turbine 132 is drivingly coupled with the HP compressor 128. The high energy combustion products then flow to a low-pressure turbine 134 ("LP turbine 134"). The LP turbine 134 drives the LP compressor 126 and components of the fan section 118 through a low-pressure shaft 138 ("LP shaft 138"). In this regard, the LP turbine 134 is drivingly coupled with the LP compressor 126 and components of the fan section 118. The LP shaft 138 is coaxial with the HP shaft 136 in this example. After driving each of the turbines 132, 134, the combustion products exit the core turbine engine 120 through a core exhaust nozzle 140 to produce propulsive thrust. Accordingly, the core turbine engine 120 defines a core flow path or core duct 142 that extends between the core inlet 124 and the core exhaust nozzle 140. The core duct 142 is an annular duct positioned generally inward of the core cowl 122 along the radial direction R.

The fan section 118 includes a fan 144, which is a primary fan in this example. For the depicted example of FIG. 1, the fan 144 is an open-rotor or unducted fan. However, in other examples, the fan 144 may be ducted (e.g., by a fan casing or nacelle circumferentially surrounding the fan 144). As depicted, the fan 144 includes an array of fan blades 146 (only one shown in FIG. 1) and an array of splitter blades 148 (only one shown in FIG. 1). The fan blades 146 (also referred to herein as primary blades or main blades) have a first span that is larger than a second span of the splitter blades 148 (also referred to herein as a second or secondary blade). The term "span" (also referred to herein as a radial length or height) as it relates to a blade of a turbine engine refers to a distance measured in the radial direction between a root of an airfoil of the blade and a tip of the airfoil of the blade.

The fan blades 146 and the splitter blades 148 are rotatable about the axial centerline axis 112. As noted above, the fan 144 is drivingly coupled with the LP turbine 134 via the LP shaft 138. The fan 144 can be directly coupled with the LP shaft 138 (e.g., in a direct-drive configuration). In some examples, as shown in FIG. 1, the fan 144 can be coupled with the LP shaft 138 via a speed reduction gearbox 155 (e.g., in an indirect-drive or geared-drive configuration). For example, the fan 144 can be rotatable via a fan shaft 139 that is powered by the LP shaft 138 across the speed reduction gearbox 155, which includes gears for adjusting the rotational speed of the fan shaft 139 relative to the LP shaft 138.

Each of the fan blades 146 and the splitter blades 148 are coupled at their respective roots to trunnions 150 (only one shown in FIG. 1). The trunnions 150 are covered by a hub 154 (e.g., a circumferential hub) that is aerodynamically contoured to promote airflow through the blades 146, 148. The fan blades 146 and the splitter blades 148 can extend radially away from the hub 154. Moreover, the trunnions 150 are rotatably mounted within the hub 154. In some examples, the hub 154 implements means for covering. In some examples, the fan blades 146 and/or the splitter blades 148 implement means for pushing air.

In this example, each fan blade 146 defines a respective central blade axis 156 (only one shown in FIG. 1). Each fan blade 146, being attached to the corresponding trunnion 150, is rotatable about its respective central blade axis 156 (e.g., in unison with one another). This rotation can be used to control the pitch of the fan blades 146. One or more actuators 158 can be controlled to pitch the fan blades 146 about their respective central blade axis 156 (e.g., via the trunnions 150).

The fan section 118 further includes a fan outlet guide vane array 160 that includes fan outlet guide vanes 162 (only one shown in FIG. 1) disposed around the axial centerline axis 112. For this example, the fan outlet guide vanes 162 are not rotatable about the axial centerline axis 112. Each fan outlet guide vane 162 has a root, a tip, and a span defined therebetween. The fan outlet guide vanes 162 may be unshrouded as shown in FIG. 1 or may be shrouded (e.g., by an annular shroud spaced outward from the tips of the fan outlet guide vanes 162 along the radial direction R). Each fan outlet guide vane 162 defines a central blade axis 164 (e.g., a pitch axis). For this example, each fan outlet guide vane 162 of the fan outlet guide vane array 160 is rotatable about its respective central blade axis 164 (e.g., in unison with one another). One or more actuators 166 can be controlled to pitch the fan outlet guide vane 162 about their respective central blade axis 164. However, in other examples, each fan outlet guide vane 162 may be fixed or unable to be pitched about its central blade axis 164. The fan outlet guide vanes 162 are mounted to a fan cowl 170.

As shown in FIG. 1, in addition to the fan 144, which is unducted, a ducted fan 184 is included aft of the fan 144, such that the turbine engine 100 includes both a ducted fan and an unducted fan that both serve to generate thrust through the movement of air without passage through core turbine engine 120. The ducted fan 184 is shown at about the same axial location as the fan outlet guide vane 162, and radially inward of the fan outlet guide vane 162. Alternatively, the ducted fan 184 may be between the fan outlet guide vane 162 and core duct 142, or be farther forward of the fan outlet guide vane 162. The ducted fan 184 may be driven by the low-pressure turbine 134 (e.g., coupled to the low-pressure shaft 138), or by any other suitable source of rotation, and may serve as the first stage of booster or may be operated separately.

The fan cowl 170 annularly encases at least a portion of the core cowl 122 and is generally positioned outward of the core cowl 122 along the radial direction R. Particularly, a downstream section of the fan cowl 170 extends over a forward portion of the core cowl 122 to define a fan flow path or fan duct 172. Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 of FIG. 1 are connected together and supported by a plurality of substantially radially-extending, circumferentially-spaced stationary struts 174 (only one shown in FIG. 1). The stationary struts 174 may each be aerodynamically contoured to direct air flowing thereby. In some examples, other struts are provided in addition to the stationary struts 174 to connect and support the fan cowl 170 or core cowl 122. In many examples, the fan duct 172 and the core cowl 122 may at least partially co-extend (generally axially) on opposite sides (e.g., opposite radial sides) of the core cowl 122. For example, the fan duct 172 and the core cowl 122 may each extend directly from a leading edge 168 of the core cowl 122 and may partially co-extend generally axially on opposite radial sides of the core cowl 122.

The turbine engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 144 and the fan outlet guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a splitter or the leading edge 168 of the core cowl 122. The inlet duct 180 is wider than the core duct 142 along the radial direction R. The inlet duct 180 is also wider than the fan duct 172 along the radial direction R.

In the example of FIG. 1, the turbine engine 100 includes an array of inlet guide vanes 186 (only one shown in FIG. 1) positioned in the inlet duct 180 upstream of the ducted fan 184 and downstream of the engine inlet 182. The array of inlet guide vanes 186 are arranged around the axial centerline axis 112. Each inlet guide vane 186 of FIG. 1 defines a central blade axis (not illustrated), and is rotatable about its respective central blade axis (e.g., in unison with one another). One or more actuators 188 can be controlled to pitch the inlet guide vanes 186 about their respective central blade axis. However, in other examples, each inlet guide vane 186 may be fixed or unable to be pitched about its central blade axis.

As previously discussed, debris can pass through the fan 144 during operation of the turbine engine 100, which can limit or block air flow to the core turbine engine 120. In some examples, one or more of the fan blades 146 can become damaged upon contact with debris. In some examples, a portion of the debris may be ingested into the core turbine engine 120 through the core inlet 124, which can adversely affect engine performance and reliability, damage components of the turbine engine 100, and increase the frequency of repair and maintenance required for the turbine engine 100. For example, debris that passes through the fan section 118 can limit or block air flow at the engine inlet 182. Limited air flow to the LP compressor 126 or the HP compressor 128 can adversely affect the performance of the turbine engine 100 because the compressors 126, 128 are taxed with exerting additional power to provide the sufficient amount of compressed air to the combustor 130. Typically, the LP compressor 126 and the HP compressor 128 compress air more efficiently when more air is provided to the LP compressor 126 and the HP compressor 128 (e.g., from the engine inlet 182).

While the fan blades 146 are designed to slice and centrifugally pump the debris radially outward, a risk of debris entering the core turbine engine 120 increases when the fan 144 is a low-speed fan, low blade count fan. However, the splitter blades 148 are additional blades that increase a blade count of the fan 144 and increase localized solidity of the fan 144 (e.g., near the hub 154). The splitter blades 148 can perform debris slicing at lower span locations at which the fan blades 146 would not be able to slice the debris. In other words, the splitter blades 148 enable increased local slicing of debris near the hub 154. Moreover, the increased localized solidity of the fan 144 provided by the splitter blades 148 improves removal of debris provided by the fan 144. For example, the increased blade count near the hub 154 provides more blades for the debris to contact and be flung radially outward (e.g., radially away from the fan cowl 170 and/or through the fan duct 172), removing a greater volume of debris from an intake flow. That is, the increased local solidity of the fan 144 can move more debris towards a bypass flowpath(s) and away from the core inlet 124, particularly at low span locations. Thus, among other advantages, inclusion of the splitter blades 148 can mitigate damaging effects of debris hazards by providing additional blades to deflect, dislodge, divide, or otherwise expel debris from the fan section 118. The splitter blades 148 can also sever or cut debris into smaller pieces that are less likely to block air flow to an engine inlet or cause damage.

It is understood that the turbine engine 100 depicted in FIG. 1 is by way of example, and the turbine engine 100 may have any other configurations in other examples. For example, in other examples, different numbers or configurations of compressors, turbines, shafts, or a combination thereof may be provided. Further, in other examples, the turbine engine 100 can be configured as a two-stream engine (e.g., an engine without a third stream). In other examples, the turbine engine 100 can configured as a reverse flow engine (e.g., an engine for a direction of a flow of incoming air is generally reverse to that of a flow of air axially through the turbine engine). Further, although the gas turbine engine 100 depicted is configured as an unducted gas turbine engine (an open rotor engine) in other examples, the gas turbine engine 100 may be a ducted gas turbine engine (e.g., including an outer nacelle, also referred to as a turbofan engine). In still other examples, aspects of the present disclosure may be incorporated into any other suitable gas turbine engines, such as, for example, propfan engines, turbojet engines, and/or turboshaft engines, as well as electric-motor driven propellers/fans.

Figure 2:
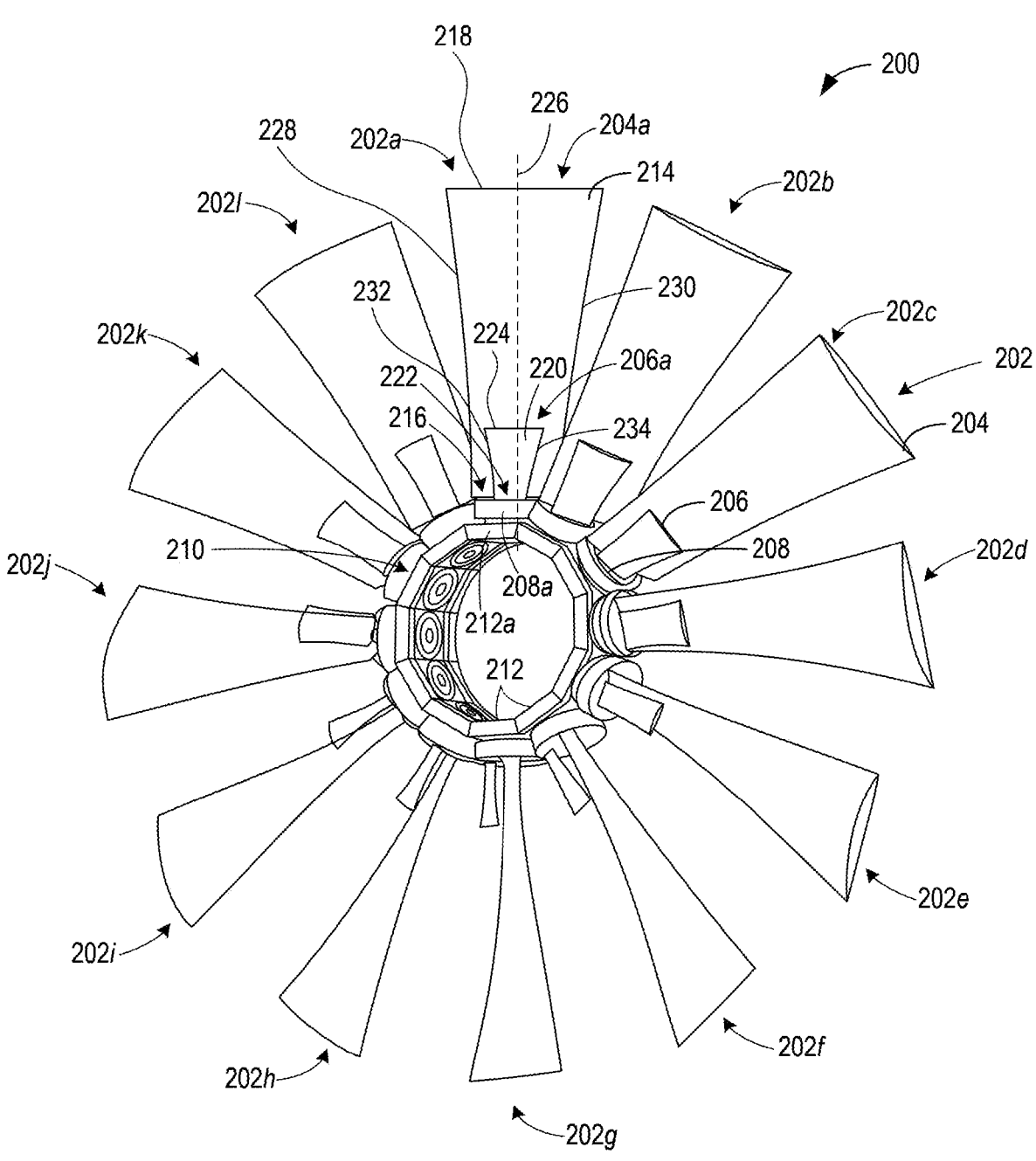
FIG. 2 is a portion of a fan constructed in accordance with teachings disclosed herein.

FIG. 2 is a perspective view of a portion of an example fan 200 for a gas turbine engine (e.g., the turbine engine 100 of FIG. 1) constructed in accordance with teachings disclosed herein. In this example, the fan 200 is an open-rotor or unducted fan, but can be ducted in other examples. In some examples, the fan 200 can implement the fan 144 of FIG. 1.

The fan 200 of FIG. 2 includes example variable pitch blade assemblies 202 circumferentially arranged about an axis of rotation (e.g., the axial centerline axis 112 of FIG. 1). In this example, the fan 200 includes twelve (12) blade assemblies 202, labeled as 202a-2021. In some examples, the fan 200 includes 8-26 blade assemblies 202. In other examples, the fan 200 can include more or fewer blade assemblies 202. The blade assemblies 202 are oriented radially (e.g., in the radial direction R depicted in FIG. 2) relative to the axial centerline axis 112.

The blade assemblies 202a-2021 of FIG. 2 are substantially similar to one another. For example, each blade assembly 202a-2021 of FIG. 2 includes a fan blade 204 (e.g., one of the fan blades 146 of FIG. 1, etc.), a splitter blade 206 (e.g., one of the splitter blades 148 of FIG. 1, etc.), and a trunnion 208 (e.g., one of the trunnions 150 of FIG. 1). It is understood, however, that one or more of the blade assemblies 202a-2021 can differ in other examples. For example, each blade assembly 202 of FIG. 2 includes one splitter blade 206. However, as discussed in greater detail in relation to FIGS. 11A-11B, one or more of the blade assemblies 202a-202l can include multiple splitter blades 206.

In the illustrated example of FIG. 2, the fan 200 includes a disk 210 having example disk segments 212. The disk segments 212 are disposed at different circumferential positions in a generally circular or annular configuration about the axial centerline axis 112 (FIG. 1). In this example, the blade assemblies 202 are coupled to the disk 210 via the disk segments 212. More specifically, the trunnions 208 are coupled to the disk segments 212 such that the blades 204, 206 extend outwardly relative to the disk 210 along the radial direction R. The blade assemblies 202 and the disk 210 are together rotatable about a first axis of rotation (e.g., the axial centerline axis 112 of FIG. 1). Further as illustrated in FIG. 2, the trunnions 208 can be rotatably coupled to the disk segments 212. In particular, each of the blade assemblies 202 of FIG. 2 can be rotated (pitched) about a second axis of rotation (e.g., a pitch axis) extending radially from the axial centerline axis 112.

The trunnions 208 of FIG. 2 are rotatable within a hub (e.g., the hub 154 of FIG. 1) of the turbine engine 100. While not illustrated in FIG. 2, the fan blades 204 and/or the splitter blades 206 can extend radially outward from the hub 154. The blade assemblies 202a-2021 are rotatable about their respective radial pitch axes to pitch their respective blades 204, 206. In some examples, the blade assemblies 202 can be rotated via one or more actuators (e.g., the actuator 158 of FIG. 1). In some examples, the trunnions 208 are operatively coupled to an actuator(s) 158 via a unison ring (not shown) such that the actuator(s) 158 can be used to rotate all of the trunnions 208 simultaneously (e.g., in unison).

For purposes of illustrative explanation, the first blade assembly 202a will now be described in greater detail. It is understood, however, that any aspects disclosed in connection with the first blade assembly 202a can likewise apply to the other blade assemblies 202b-2021.

As illustrated in FIG. 2, the first blade assembly 202*a* includes a first fan blade ("fan blade 204*a*") coupled to a first trunnion ("trunnion 208*a*"). The fan blade 204*a* includes a first airfoil 214 oriented radially (e.g., in the radial direction R depicted in FIG. 2) relative to the axial centerline axis 112 (FIG. 1). The first airfoil 214 includes a first root 216 (e.g., a first base), a first tip 218, and a first blade span (e.g., a radial length or height) defined therebetween. In particular, the first blade span is defined by a radial distance between the first root 216 and the first tip 218 of the fan blade 204*a*. The fan blade 204*a* is coupled to the trunnion 208*a* at its root 216 such that the first airfoil 214 extends radially outward from the trunnion 208*a*.

The first blade assembly 202*a* further includes a first splitter blade ("splitter blade 206*a*") coupled to the trunnion 208*a*. In other words, the trunnion 208*a* includes multiple blades 204*a*, 206*a* coupled thereto. As illustrated in FIG. 2, the splitter blade 206*a* includes a second airfoil 220 having a second root 222 (e.g., a second base), a second tip 224, and a second blade span defined therebetween. In particular, the second blade span is defined by a radial distance between the second root 222 and the second tip 224 of the splitter blade 206*a*. As illustrated in FIG. 2, the second span of the splitter blade 206*a* is less than the first span of the fan blade 204. Similar to the fan blade 204*a*, the splitter blade 206*a* is coupled to the trunnion 208*a* at its root 222 such that the second airfoil 220 extends radially outward from the trunnion 208*a*.

In some examples, the fan blade 204*a* includes a composite material. For example, the fan blade 204*a* can include a woven composite material. As used herein, the term "composite material" refers to a material produced from two or more constituent materials, wherein at least one of the constituent materials is a non-metallic material. Example composite materials include polymer matrix composites (PMC), ceramic matrix composites (CMC), chopped fiber composite materials, etc. As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. In some examples, the fan blade 204*a* includes a metal material. The splitter blade 206*a* can include a composite material and/or metal. In some examples, the fan blade 204*a* and the splitter blade 206*a* include a same material. In some examples, the fan blade 204*a* includes a first material and the splitter blade 206*a* includes a second material different from the first material.

In some examples, the fan blade 204*a* and/or the splitter blade 206*a* can be coupled to the trunnion 208*a* via respective spars. For example, the spars can be coupled to the blades 204*a*, 206*a* within the interiors of the blades 204*a*, 206*a*. Examples of trunnions with one or more splitter spars are discussed in greater detail in relation to FIGS. 3A-3B, 4, 5A-5B, 6A-6B, and 7. In some examples, the splitter blade 206*a* is coupled to the trunnions 208*a* via dovetails (discussed in greater detail in relation to FIGS. 8A-10). In some examples, one or more of the splitter blades 206*a* can be integrally formed with the trunnion 208*a* (discussed in greater detail in relation to FIG. 7).

The first blade assembly 202*a* is rotatable about a first pitch axis 226. In some examples, the first blade assembly 202*a* has a range of rotation up to and including 120 degrees. The trunnion 208*a* can be caused to rotate about the pitch axis 226 (e.g., via an actuator). In turn, the rotation of the trunnion 208*a* causes the fan blade 204*a* to rotate about the first pitch axis 226 to adjust a first pitch (also referred to herein as a pitch angle) of the fan blade 204*a*. Similarly, the rotation of the trunnion 208*a* causes the splitter blade 206*a* to rotate about the pitch axis 226 to adjust a second pitch of the splitter blade 206*a*. The fan blade 204*a* is radially aligned with the pitch axis 226. In particular, the trunnion 208*a* and the fan blade 204*a* are coaxial and aligned with the pitch axis 226. Thus, the splitter blade 206*a* can be pitched in approximately the same forward pitch as the fan blade 204*a*. However, the splitter blade 206*a* is laterally offset relative to the pitch axis 226 and the fan blade 204*a*. As such, the rotation of the trunnion 208*a* likewise causes the splitter blade 206*a* to rotate about the fan blade 204*a*. That is, the trunnion 208*a* maintains the splitter blade 206*a* in pitch-wise alignment with the fan blade 204*a* (e.g., to prevent or limit instances of stall).

In other words, the trunnion 208*a* having the multiple blades 204*a*, 206*a* coupled thereto is a rotatable trunnion. That is, the trunnion 208*a* is rotatable about the pitch axis 226 to rotate both the fan blade 204*a* and the splitter blade 206*a* about the pitch axis 226 (e.g., in unison). In this example, the trunnion 208*a* is rotatable relative to a first disk segment ("disk segment 212*a*") to allow for varying pitch of the blades 204*a*, 206*a*. In turn, the fan blades 204*a* and the splitter blades 206*a* are rotatable relative to the disk segment 212*a*.

The splitter blade 206*a* can have a different shape, size, position, etc., relative to the fan blade 204*a*. The fan blade 204*a* has a first chord length (e.g., chord length), which is a straight-line measurement between a leading edge 228 of the fan blade 204*a* and a trailing edge 230 of the fan blade 204*a*. Depending on a design of the fan blade 204*a*, the first chord can be different at different locations along the first span of the fan blade 204*a*. The splitter blade 206*a* has a second chord (e.g., chord length), which is a straight-line measurement between a leading edge 232 of the splitter blade 206*a* and a trailing edge 234 of the splitter blade 206*a*. Depending on a design of the splitter blade 206*a*, the second chord can be different at different locations along the second span of the splitter blade 206*a*. When the first chord is at or proximate (e.g., adjacent) the first tip 218 of the fan blade 204*a*, the first chord is larger than the second chord length. In some examples, the splitter blade 206*a* is between 10% to 25% the size of the fan blade 204*a*.

In some examples, the blade assemblies 202 and/or the disk 210 implement a variable pitch fan assembly. In some examples, the trunnion 208*a* and/or any other trunnion 208 of FIG. 2 implements means for rotating. In some examples, the first blade assembly 202*a* and/or any other blade assembly 202 of FIG. 2 implements means for moving air.

Figures 3A, 3B:
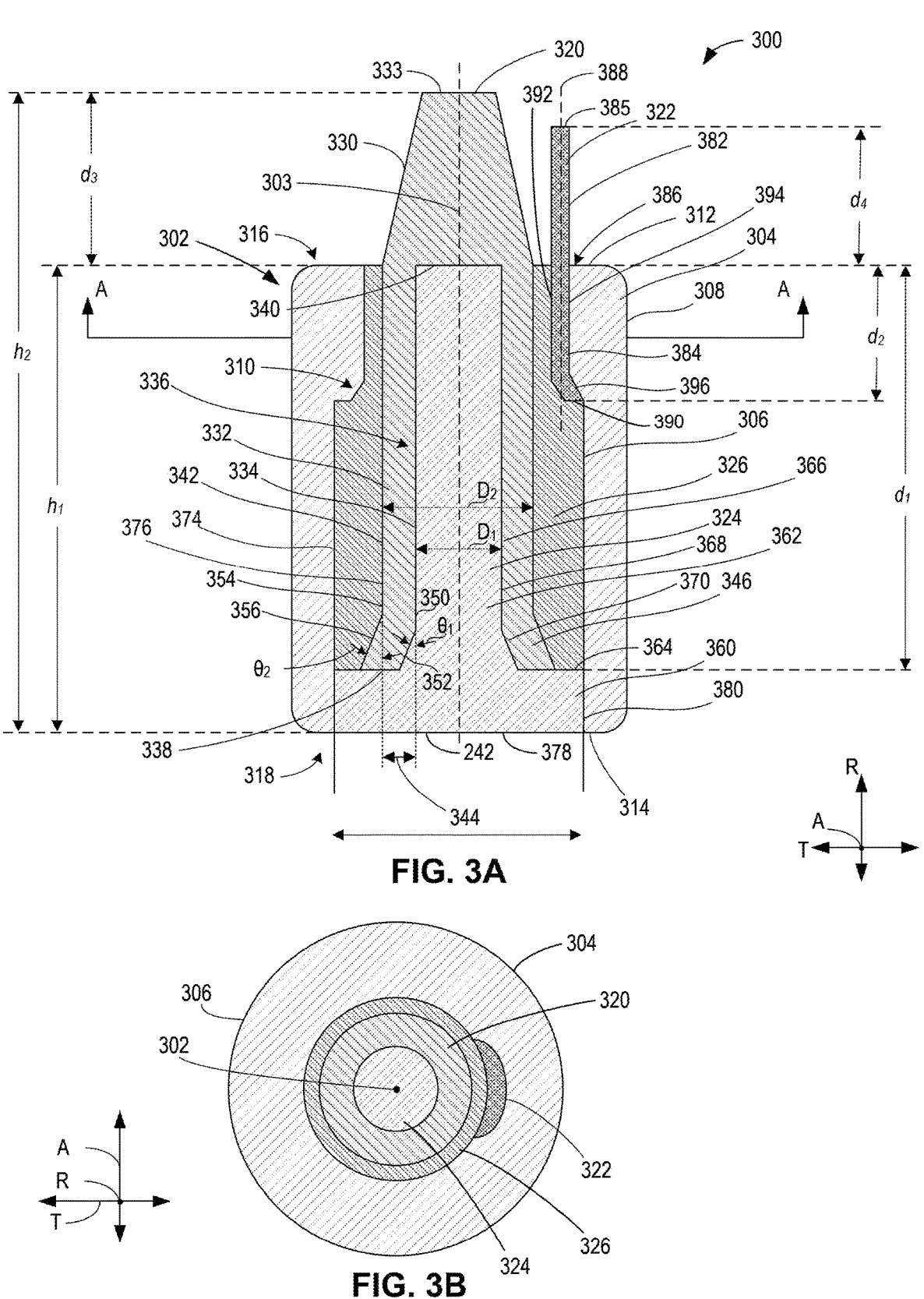
FIG. 3A is a schematic cross-sectional view of a variable pitch blade assembly including a trunnion constructed in accordance with teachings disclosed herein.
FIG. 3B is a schematic cross-sectional view of the variable pitch blade assembly of FIG. 3A along the line A-A.

FIGS. 3A and 3B illustrate a portion of an example variable pitch blade assembly 300 including an example trunnion 302 for a gas turbine engine (e.g., the turbine engine 100 of FIG. 1) constructed in accordance with teachings disclosed herein. More specifically, FIG. 3A is a schematic cross-sectional view of the variable pitch blade assembly 300 and FIG. 3B is a top-down view of the variable pitch blade assembly 300 along the line A-A of FIG. 3A. In some examples, the trunnion 302 of FIGS. 3A and 3B can implement one or more of the trunnions disclosed herein (e.g., one or more trunnion(s) 150 of FIG. 1, one or more trunnion(s) 208 of FIG. 2, etc.).

FIGS. 3A and 3B are also annotated with reference to the axial direction A, the radial direction R, and a transverse direction T. As shown in FIGS. 3A and 3B, the trunnion 302 defines a longitudinal or pitch axis 303 extending therethrough for reference. The pitch axis 303 is a second axis of rotation about which the trunnion 302 rotates. The pitch axis 303 extends generally parallel relative to the radial direction R. The transverse direction T is a direction perpendicular to the pitch axis 303 and points towards (inward) or away from (outward) the pitch axis 303. As used herein, the terms "transverse" and "horizontal" discussed with respect to a trunnion refer to a surface or plane that is perpendicular to the pitch axis 303.

Referring to FIG. 3A, the trunnion 302 includes a substantially tubular outer sleeve 304 (e.g., a casing, a shell, a shroud, a housing, etc.). In some examples, the outer sleeve 304 implements means for housing. The outer sleeve 304 extends along the radial direction R and circumscribes the pitch axis 303. The outer sleeve 304 has a first annular surface 306, referred to herein as an inner surface, and a second annular surface 308, referred to herein as an outer surface, which is spaced apart from the inner surface 306 to define a thickness of the outer sleeve 304. In this example, the inner surface 306 defines an interior 310 of the trunnion 302 and the outer surface 308 defines an exterior surface of the trunnion 302. In this example, the outer surface 308 has a substantially circular cross-section, but can have other cross-section shapes (e.g., ovular, rectangular, etc.) in other examples. In some examples, the outer sleeve 304 implements means for housing.

Additionally, the outer sleeve 304 has a first horizontal or transverse surface 312 and a second horizontal or transverse surface 314 opposite the first transverse surface 312. In particular, the first transverse surface 312 is located radially outward relative to the second transverse surface 314. The transverse surfaces 312, 314 of FIGS. 3A and 3B have annular cross-sections. The outer sleeve 304 has a first height (denoted $h_1$) (e.g., a first radial length) defined along the radial direction R between the first transverse surface 312 and the second transverse surfaces 314.

The trunnion 302 of FIGS. 3A and 3B has a first end 316, referred to as a face, and a second end 318, referred to as a base. In this example, the face 316 of the trunnion 302 is defined by the first transverse surface 312 and the base 318 of the trunnion 302 is defined by the second transverse surface 314. When the trunnion 302 is installed in the turbine engine 100, the base 318 is a radially inward facing surface of the trunnion 302 and the face 316 is a radially outward facing surface of the trunnion 302.

The trunnion 302 is couplable with blades of the turbine engine 100 (FIG. 1). In particular, the trunnion 302 can be used to couple a primary blade (not shown) and one or more corresponding splitter blades (not shown) to the turbine engine 100. For example, the trunnion 302 can be coupled to a rotor or stator at the base 318 and to the primary and splitter blades at the face 316. In some examples, the primary blade can correspond to the fan blade 204a of FIG. 2 and the splitter blade can correspond to the splitter blade 206a of FIG. 2. It is understood, however, that the primary blade can be another blade in other examples, such as (but not limited to) another fan blade (e.g., a fan blade 146 of the unducted fan 144 of FIG. 1, a blade of the ducted fan 184 of FIG. 1, a fan blade 204 of the fan 200 of FIG. 2, etc.), a vane (e.g., one or more outlet guide vanes 162 of FIG. 1), a propeller, and/or another airfoil of the turbine engine 100, another gas turbine engine, and/or another electric motor-driven blade. Further, the one or more corresponding splitter blades can additionally or alternatively one or more splitter blades 148 of FIG. 1, another splitter blade(s) 206 of FIG. 2, and/or another partial-span blade.

The variable pitch blade assembly 300 includes a first spar 320 (also referred to herein as a main or primary spar) and a second spar 322 (also referred to herein as a splitter spar).

As illustrated in the example of FIG. 3A, the trunnion 302 includes or is couplable with the first spar 320 and the second spar 322. As depicted, the spars 320, 322 extend from the interior 310 of the outer sleeve 304 and protrude (e.g., project, etc.) from the face 316 of the trunnion 302. The spars 320, 322 are configured to mount the blades 204a, 206a to the trunnion 302. The first spar 320 is structured to mount the primary blade (e.g., fan blade 204a of FIG. 2) to the trunnion 302 and the second spar 322 is structured to mount the splitter blade (e.g., the splitter blade 206a of FIG. 2) to the trunnion 302. In some examples, the first spar 320 and/or the second spar 322 implements means for mounting. The first spar 320 extends along the pitch axis 303. The second spar 322 is laterally offset relative to the first spar 320 and the pitch axis 303.

Additionally, the trunnion 302 of FIGS. 3A and 3B includes a first inner sleeve ("inner sleeve 324") and a second inner sleeve ("intermediate sleeve 326"). The inner sleeve 324 and the intermediate sleeve 326 are disposed in the interior 310 of the outer sleeve 304. As discussed in further detail below, the inner sleeve 324 and the intermediate sleeve 326 are configured to hold (e.g., lock, secure, retain, etc.) the first spar 320, while the intermediate sleeve 326 and the outer sleeve 304 are configured to hold (e.g., lock, secure, retain, etc.) the second spar 322. In particular, the trunnion 302 can be configured to receive the first spar 320 and the second spar 322 such that the trunnion 302 can hold the blades 204a, 206a. In some examples, the inner sleeve 324 and/or the intermediate sleeve 326 implements means for securing. As illustrated in FIG. 3B, the first spar 320 is coaxial with the inner sleeve 324, the intermediate sleeve 326, and the outer sleeve 304. While the trunnion 302 of FIGS. 3A-3B include two inner sleeves, in other examples, the trunnion 302 can include one inner sleeve (FIGS. 6A-6B) or more than two inner sleeves.

In some examples, the first spar 320, the second spar 322, the inner sleeve 324, and/or the intermediate sleeve 326 include a metal, such as (but not limited to) titanium, steel, Inconel®, another metal, and/or a combination thereof. Typically, the outer sleeve 304, the first spar 320, the second spar 322, the inner sleeve 324, and the intermediate sleeve 326 are formed of the same material (e.g., a first material) to prevent galvanic corrosion. In some examples, however, one or more of the outer sleeve 304, the first spar 320, the second spar 322, the inner sleeve 324, and/or the intermediate sleeve 326 can include a second material that is different from the first material. For example, in some instances, the first spar 320 and/or the second spar 322 can include a polymer matrix composite material, including carbon fiber composites. In some such instances, outer plies or layers of the composite material can be covered (e.g., coated) with fiberglass plies to separate the carbon fiber composite from the metal trunnion to prevent galvanic corrosion.

As illustrated in FIG. 3A, the first spar 320 includes a first portion ("first mounting portion 330") (e.g., a spar portion, etc.) and a second portion ("first base 332") (e.g., a base portion, a root, a stem, etc.). Typically, the first mounting portion 330 and the first base 332 are integrally formed but can be coupled in some examples.

The first mounting portion 330 protrudes (e.g., projects, extends, etc.) from the face 316 of the trunnion 302. The first mounting portion 330 is couplable to a base (e.g., the first root 216 of FIG. 2) of the fan blade 204a to hold the fan blade 204a relative to the trunnion 302. For example, the first mounting portion 330 can hold the fan blade 204a while the trunnion 302 rotates about pitch axis 303. Further, the first mounting portion 330 can hold the fan blade 204a while the trunnion 302 rotates about the axial centerline axis 112. The first mounting portion 330 of the first spar 320 has a shape that enables the first spar 320 to hold the fan blade 204a. For example, the first mounting portion 330 can have a shaft-like shape and the fan blade 204a can have a round or tubular shape at the first root 216, which transitions to a panel-like shape (e.g., the first airfoil 214 of FIG. 2). However, the first mounting portion 330 and the first root 216 of the fan blade 204a can have other complementary shapes in other examples.

The first base 332 of the first spar 320 is disposed in the interior 310 of the outer sleeve 304 of the trunnion 302. In particular, the first mounting portion 330 is affixed (e.g., held, locked, secured, attached, fastened, etc.) to the trunnion 302 by the first base 332, enabling the first mounting portion 330 to hold the fan blade 204a relative to the trunnion 302. More specifically, the first base 332 is retained by the inner sleeve 324 and the intermediate sleeve 326 of the trunnion 302. As illustrated in FIGS. 3A and 3B, the first base 332 is disposed between the inner sleeve 324 and the intermediate sleeve 326 such that the inner sleeves 324, 326 lock the first base 332 of the first spar 320 within the outer sleeve 304.

The first base 332 of FIGS. 3A-3B includes an inner surface 334 defining a bore 336 (e.g., a borehole, a hole, etc.). The inner surface 334 circumscribes the pitch axis 303 and extends along the radial direction R. The inner surface 334 of the first base 332 defines a cross-sectional dimension (e.g., a diameter or hydraulic diameter) of the bore 336. The bore 336 has a depth extending along the radial direction from a distal surface 338, which is a radially innermost surface of the first base 332, to a recessed surface 340 located radially outward from the distal surface 338.

The inner surface 334 is spaced apart from an outer surface 342 of the first spar 320 to define a thickness 344 of the first base 332. In other words, the first base 332 of the first spar 320 includes a tubular portion extending radially inward from the first mounting portion 330. Stated differently, the first base 332 implements a tubular root of the first spar 320 that is housed within the outer sleeve 304. In the illustrated example of FIGS. 3A-3B, the first base 332 is cylindrical, having a circular cross-sectional area. In particular, each of the inner surface 334 and the outer surface 342 of FIGS. 3A and 3B have a cross-sectional shape that is circular. However, examples disclosed herein are not limited thereto. In other examples, the inner and outer surfaces 334, 342 of the first base 332 can have a different cross-sectional shape such as, but not limited to, rectangular, oval, etc.

In some examples, the thickness 344 of the first base 332 is approximately between 3 millimeters (mm) and 30 mm, but can be smaller (e.g., smaller than 3 mm) or larger (e.g., larger than 30 mm) in other examples. In this example, the thickness 344 of the first base 332 is substantially constant (e.g., equal) along the depth of the bore 336. In particular, a distance defined between the inner surface 334 and the outer surface 342 in the transverse direction T is substantially equal (within +/−10 percent or within +/−3 mm) between the recessed surface 340 and the distal surface 338. During fabrication of the trunnion 302, it is possible for one or more voids (spaces, gaps, pockets, etc.) (not illustrated) to form within the first base 332 of the spar 320, between the first base 332 and the inner sleeve 324, and/or between the first base 332 and the intermediate sleeve 326. To enable retention of the fan blade 204a, it is important to reduce or limit instances of such voids. The constant thickness 344 of the first base 332 between the inner sleeve 324 and the intermediate sleeve 326 is indicative that such voids did not form during manufacture of the trunnion 302.

As illustrated in FIG. 3A, the first spar 320 widens proximate to the distal surface 338 of the first base 332 to form a lip 346 (e.g., a skirt, a rim, an edge, etc.). In particular, the first base 332 can expand or increase in its diameter proximate to the distal surface 338 to form the lip 346. For example, the first base 332 of the first spar 320 has an inner diameter (denoted $D_1$) defined by the inner surface 334. In this example, the inner diameter $D_1$ is substantially equal (within +/−10 percent) along a first radial length of the first base 332 defined between the recessed surface 340 to the lip 346. At the lip 346, the inner diameter $D_1$ of the first base 332 increases (e.g., widens, expands, etc.). In other words, the inner surface 334 of the first base 332 is substantially parallel relative to the pitch axis 303 from the recessed surface 340 to the lip 346, at which the inner surface 334 diverges outward or away from the pitch axis 303.

The outer surface 342 of the first base 332 likewise diverges outward or away from the pitch axis 303. As illustrated in the example of FIG. 3A, the first base 332 of the first spar 320 has an outer diameter (denoted $D_2$) defined by the outer surface 342 that increases proximate to the distal surface 338. The inner diameter $D_1$ and the outer diameter $D_2$ increase at substantially the same rate such that the thickness 344 of the first base 332 remains constant. Stated differently, as illustrated in FIG. 3A, the inner surface 334 of the first base 332 has first cross-sectional profile defined along the radial direction R. The first cross-sectional profile of the inner surface 334 includes a first portion 350 (e.g., a first straight or linear portion) that is substantially parallel relative to the pitch axis 303. The first portion 350 extends radially from the recessed surface 340 to the lip 346. The first cross-sectional profile of the inner surface 334 also includes a second portion 352 (e.g., a second straight or linear portion) that radially extends from the lip 346 to the distal surface 338. The first portion 350 and the second portion 352 form a first angle (denoted $\theta_1$).

The outer surface 342 has a second cross-sectional profile along the radial direction R that is similar to the first cross-sectional profile of the inner surface 334. More specifically, the second cross-sectional profile of the outer surface 342 includes a third portion 354 (e.g., a third straight or linear portion) that is substantially parallel relative to the pitch axis 303. The third portion 354 extends from the recessed surface 340 to the lip 346. The second cross-sectional profile of the outer surface 342 also includes a fourth portion 356 (e.g., a fourth straight or linear portion) that extends radially from the lip 346 to the distal surface 338. The third portion 354 and the fourth portion 356 form a second angle (denoted $\theta_2$), which is substantially the same as the first angle $\theta_1$.

In other examples, the second portion 352 of the inner surface 334 and the fourth portion 356 of the outer surface 342 can include curvature. For example, the second portion 352 can have a first radius of curvature and the fourth portion 356 can have a second radius of curvature that is substantially similar to the first radius of curvature. In other words, the first base 332 of FIG. 3A includes an angle proximate to the distal surface 338 of the spar 320, but can include a curve (e.g., a bend) in other examples.

As shown, the inner sleeve 324 of FIGS. 3A and 3B includes a pedestal 360 (e.g., a pedestal portion, a base, a platform, a foot, etc.) and a column 362 (e.g., a column portion, a rod, an arm, a support, etc.) extending from a first surface 364 (e.g., an upper surface) of the pedestal 360. The inner sleeve 324 is configured to help retain the first spar 320 relative to the trunnion 302. As illustrated in FIG. 3A, the distal surface 338 of the first spar 320 is located adjacent to and abuts the first surface 364 of the pedestal 360. Accordingly, the pedestal 360 can help hold the first spar 320 with respect to the radial direction R. Further, the column 362 is positioned within the bore 336 of the first spar 320. As such, the column 362 can help hold the first base 332 of the first spar 320 relative to the pitch axis 303 in an axial direction and/or a transverse direction.

The column 362 extends along the radial direction R from the first surface 364 of the pedestal 360 and is aligned with the pitch axis 303. As illustrated, the column 362 has a second surface 366 (e.g., an outer surface) extending along the radial direction R that circumscribes the pitch axis 303. The second surface 366 of the column 362 is located adjacent to and abuts the inner surface 334 of the first spar 320 to help retain the first base 332 of the first spar 320 relative to the pitch axis 303. In particular, the second surface 366 of the column 362 and the inner surface 334 of the first spar 320 are complementary (e.g., matching, etc.). Similar to the inner surface 334 of the first spar 320, the column 362 in this example has a cross-sectional area that is circular (e.g., the second surface 366 is an annular surface), but can have a different cross-sectional shape in other examples. Stated differently, the trunnion 302 includes an oblong inner sleeve having the second surface 366 that closely follows the inner surface 334 of the first base 332 of the first spar 320.

As illustrated in FIG. 3A, the second surface 366 has third cross-sectional profile extending along the radial direction R that follows the first cross-sectional profile of the inner surface 334. In particular, the third cross-section profile includes a fifth portion 368 (e.g., a fifth straight or linear portion) that is substantially parallel relative to the pitch axis 303, and sixth portion 370 (e.g., a sixth straight or linear portion) that extending therefrom. In this example, the fifth portion 368 and the sixth portion 370 form the first angle $\theta_1$, but can include another angle in other examples. Stated differently, the column 362 of FIG. 3A includes an angle proximate to the first surface 364 of the pedestal 360 but can include a curve in other examples.

The intermediate sleeve 326 of FIGS. 3A and 3B includes an annular wall having a first surface 374, referred to herein as an inner surface, and a second surface 376, referred to herein as an outer surface, and a thickness defined therebetween. The inner and outer surfaces 374, 376 extend along the radial direction R and circumscribe the pitch axis 303. The intermediate sleeve 326 is configured to help retain the first spar 320 relative to the trunnion 302.

As illustrated in FIG. 3A, the intermediate sleeve 326 is positioned between the outer sleeve 304 and the first spar 320. In particular, the intermediate sleeve 326 is sandwiched (e.g., wedged, interposed, etc.) between the first base 332 of the first spar 320 and the outer sleeve 304. As shown in FIG. 3A, the outer surface 376 of the intermediate sleeve 326 is located adjacent to and abuts the inner surface 306 of the outer sleeve 304 while the inner surface 374 of the intermediate sleeve 326 is located adjacent to and abuts the outer surface 342 of the first spar 320.

The first spar 320 is positioned between the intermediate sleeve 326 and the inner sleeve 324. That is, the first base 332 of the first spar 320 is sandwiched (e.g., wedged, interposed, etc.) between the column 362 of the inner sleeve 324 and the intermediate sleeve 326. For example, the outer surface 342 of the first base 332 is located adjacent and abuts the inner surface 374 of the intermediate sleeve 326 and the inner surface 334 of the first base 332 is located adjacent to and abuts the outer surface 366 of the inner sleeve 324. Accordingly, the inner sleeve 324, the intermediate sleeve 326, and the outer sleeve 304 together lock the first base 332 of the first spar 320 relative to the trunnion 302 and, more generally, the turbine engine 100 (FIG. 1). In other words, the first spar 320 can secure the first airfoil 214 of the fan blade 204a at its root 216, and the sleeves 304, 324, 326 can secure the first spar 320 at via the first base 332 of the first spar 320.

As depicted in FIG. 3A, the pedestal 360 of the inner sleeve 324 also includes a second surface 378 (e.g., a lower surface) opposite the inner surface 374, and a third surface 380 (e.g., a lateral surface, an edge, etc.) extending between the first and second surfaces 364, 378. In this example, the pedestal 360 is cylindrical. Thus, the first and second surfaces 364, 378 are horizontal or transverse surfaces and the third surface 380 is an annular surface circumscribing the pitch axis 303. The third surface 380 is located adjacent to and abuts the inner surface 306 of the outer sleeve 304 to help secure the inner sleeve 324 relative to the outer sleeve 304. In this example, the second surface of the inner sleeve 324 is flush with the base 318 of the trunnion 302 but can be radially inward or radially outward relative to the base 318 in other examples.

Like the first spar 320, the second spar 322 of FIGS. 3A and 3B includes a first portion ("second mounting portion 382") (e.g., a spar portion, etc.) and a second portion ("second base 384") (e.g., a base portion, a root, a stem, etc.). Typically, the second mounting portion 382 and the base 384 are integrally formed but can be coupled in some examples. The second mounting portion 382 protrudes (e.g., projects, extends, etc.) from the face 316 of the trunnion 302. In some examples, the second mounting portion 382 of the second spar 322 is couplable to a base (e.g., the second root 222 of FIG. 2) of the splitter blade 206a to hold the splitter blade 206a relative to the trunnion 302. For example, the second mounting portion 382 can retain the splitter blade 206a while the trunnion 302 rotates about pitch axis 303 and/or while the trunnion 302 rotates about the axial centerline axis 112. Thus, the second mounting portion 382 of the second spar 322 can have a shape that enables the second spar 322 to hold the splitter blade 206a. In particular, the second mounting portion 382 can have a shape that is complementary to an interior of the splitter blade 206a at its root 222. In some examples, the second mounting portion 382 implements a splitter blade (e.g., the splitter blade 206a). For example, the second mounting portion 382 can have an airfoil or airfoil-like shape. In some examples, the second spar 322 implements means for moving air.

The second mounting portion 382 is affixed (e.g., held, locked, secured, attached, fastened, etc.) to the trunnion 302 by the base 384, enabling the second mounting portion 382 to hold the splitter blade 206a relative to the trunnion 302. Specifically, the base 384 is disposed in the interior 310 of the outer sleeve 304 to secure (e.g., retain, hold, lock, etc.) the second mounting portion 382 in place relative to the trunnion 302. For example, the base 384 can be retained by the intermediate sleeve 326 and the outer sleeve 304. In this example, the base 384 is sandwiched (e.g., wedged, interposed, etc.) between the outer sleeve 304 and the intermediate sleeve 326 such that the inner sleeves 324, 326 lock the base 384 of the second spar 322 within the outer sleeve 304.

As illustrated in the examples of FIGS. 3A and 3B, the outer sleeve 304 includes a slot 386 (e.g., a slit, a cavity, a groove, etc.) recessed into a face of the trunnion 302. For example, the slot 386 can be fabricated (e.g., machined, etc.)

radially inward into the first transverse surface 312. The outer sleeve 304 is configured to position the second spar 322 with respect to the first spar 320 via the slot 386. As depicted, the second base 384 of the second spar 322 is disposed within the slot 386 of the outer sleeve 304. The slot 386 is laterally offset relative to the first spar 320 to position the second spar 322 laterally offset relative to the first spar 320. That is, the second spar 322 has a longitudinal axis 388 that is substantially parallel relative to the pitch axis 303 but laterally offset relative to the first spar 320 and the pitch axis 303. The second base 384 of the second spar 322 has a thickness that is less than or equal to the thickness 344 of the first base 332 of the first spar 320.

The second spar 322 includes a first surface 392 (e.g., an inner surface) and a second surface 394 (e.g., an outer surface). In this example, the first and second surfaces 392, 394 are curved surfaces. More specifically, the first and second surfaces 392, 394 are arcuate surfaces that extend partially around the pitch axis 303. In other examples, however, one or more of the first and second surfaces 392, 394 can differ. For example, the first surface 392, and/or the second surfaces 394 can be straight or have a different curvature (e.g., a smaller radius of curvature). Further, in some examples, at least a portion of the surfaces 392, 394 can circumscribe the pitch axis 303 such that at least a portion of the second base 384 is annular.

In the illustrated example of FIGS. 3A and 3B, the first surface 392 is adjacent to and extends along the outer surface 376 of the intermediate sleeve 326. More specifically, the first surface 392 of the second spar 322 abuts the outer surface 376 of the intermediate sleeve 326. Accordingly, the intermediate sleeve 326 can help hold the second spar 322 relative to the pitch axis 303. As illustrated in FIG. 3B, the first surface 392 extends around only a portion of the outer surface 376 of the intermediate sleeve 326. In other examples, however, at least a portion of the first surface 392 can extend around a periphery of the intermediate sleeve 326.

Further, the second surface 394 of the second spar 322 is adjacent to and extends along the inner surface 306 of the outer sleeve 304. In particular, the second surface 394 abuts the inner surface 306 of the outer sleeve 304. Accordingly, the outer sleeve 304 can help hold the second spar 322 relative to the pitch axis 303. In other words, the second base 384 of the second spar 322 is sandwiched between the inner surface 306 of the outer sleeve 304 and the outer surface 376 of the intermediate sleeve 326 to lock the second spar 322 into the trunnion 302.

The second spar 322 of FIGS. 3A and 3B includes a lip 396 (e.g., a skirt, a rim, an edge, etc.). In particular, the second base 384 of the second spar 322 includes a curve or angle at a radially inward portion of the second base 384 to define the lip 396. While the lip 396 of FIG. 3A is straight (e.g., linear), the lip 396 can include a curve in other examples. In some examples, the lip 396 can be omitted.

As discussed above, the first base 332 of the first spar 320 is sandwiched between the column 362 of the inner sleeve 324 and the inner surface 374 of the intermediate sleeve 326. Further, the intermediate sleeve 326 is sandwiched between the first base 332 and the outer sleeve 304. Accordingly, the inner sleeve 324, the intermediate sleeve 326, and the outer sleeve 304 together lock the first base 332 of the first spar 320 relative to the trunnion 302 and, more generally, the turbine engine 100 (FIG. 1). Further, the second base 384 of the second spar 322 is sandwiched between the outer sleeve 304 and the intermediate sleeve to secure the second spar 322 relative to the trunnion 302. Thus, the second spar 322 can secure the second airfoil 220 of the splitter blade 206a at its root 222, and the sleeves 304, 324, 326 can secure the second spar 322 at its base 384. Thus, the outer sleeve 304 of FIGS. 3A and 3B encloses the inner sleeve 324, intermediate sleeve 326, the first base 332 of the first spar 320, and the second base 384 of the second spar 322.

In the illustrated example of FIG. 3A, the first spar 320 (e.g., the first base 332 of the first spar 320) extends into the interior 310 of the outer sleeve 304 a first distance (a first radial distance, denoted $d_1$) defined between the first transverse surface 312 and the distal surface 338. As shown, the second spar (e.g., the second base 384 of the second spar 322) extends into the interior 310 of the outer sleeve 304 a second distance (denoted $d_2$) defined between the first transverse surface 312 and a distal surface 390, which is a radially innermost surface of the second spar 322. In other words, the second base 384 has a radial length defined by the second distance $d_2$, which corresponds to a depth of the slot 386. Accordingly, the outer sleeve 304 can help hold the second spar 322 relative to the radial direction R. In this example, the second distance $d_2$ is smaller than the first distance $d_1$ of the first base 332. In other examples, the second distance $d_2$ can be the same or larger than the first distance $d_1$.

As illustrated in FIG. 3A, the first spar 320 (e.g., the first mounting portion 330) extends from the face 316 of the trunnion 302 a third distance (e.g., a third radial distance, denoted $d_3$) defined between the first transverse surface 312 of the trunnion 302 and a radially outer-most surface 333 of the first spar 320. Further, the second spar 322 (e.g., the second mounting portion 382) extends from the face 316 of the trunnion 302 a fourth distance (e.g., a fourth distance, denoted $d_4$) defined between the first transverse surface 312 of the trunnion 302 and a radially outer-most surface 385 of the second spar 322. Typically, the third distance $d_3$ is larger than the fourth distance $d_4$, but can be smaller or the same as the fourth distance $d_4$ in some examples.

In the example of FIGS. 3A and 3B, the trunnion 302 is a rotatable trunnion for a variable-pitch blade assembly (e.g., a variable pitch blade assembly 202a-2021 of FIG. 2). In particular, the trunnion 302 of FIGS. 3A-3B is rotatable about the pitch axis 303. As illustrated in FIG. 3B, the first spar 320, the inner sleeve 324, the intermediate sleeve 326, and the outer sleeve 304 are coaxial and circumscribe the pitch axis 303. In particular, at least a portion of each of the first spar 320, the outer sleeve 304, the inner sleeve 324, and the intermediate sleeve 326 circumscribes the pitch axis 303. In some examples, the trunnion 302 implements means for rotating.

When the blades 204a, 206a are coupled to the trunnion 302, the trunnion 302, the fan blade 204a, and the splitter blade 206a are together rotatable about the pitch axis 303. In doing so, a pitch of the blades 204a, 206a can be adjusted. In other words, the trunnion 302 can be rotated (e.g., via one or more actuators) to adjust a first pitch of the fan blade 204a, which causes adjustment of a second pitch of the splitter blade 206a. Using the trunnion 302 of FIGS. 3A and 3B, the splitter blade 206a can be pitched in approximately the same forward pitch as the fan blade 204.

While not illustrated in FIGS. 3A-3B, the variable pitch blade assembly 300 and/or, more specifically, the trunnion 302 can include one or more fasteners between adjacent components. For example, as discussed in relation to FIG. 4, one or more components of the trunnion 302 can include threaded portions such that adjacent ones of the components can thread together. In some examples, the trunnion 302 can include jam nut or other fastener at proximate to the base 318. In some examples, different bolts or other fasteners can be used to hold the different sleeves 304, 324, 326 and/or the spars 320, 322 together. In some examples, one or more of the different sleeves 304, 324, 326 and spars 320, 322 can be integrally manufactured with one another and/or with a blade(s) (e.g., the fan blade 204a and/or the splitter blade 206a) such that a curing process of the blade(s) 204a, 206a secures the components together.

Example trunnions 401, 501, 601, 701, 801, 901 are disclosed below that are similar to the trunnion 302 of FIGS. 3A and 3B. As such, the same reference numbers used for the structures shown in FIGS. 3A and 3B are used for similar or identical structures in FIGS. 4, 5A-5B, 6A-6B, 7, 8A-8B, 9A-9B. Many of the components of the trunnions 401, 501, 601, 701, 801, 901 of FIGS. 4, 5A-5B, 6A-6B, 7, 8A-8B, 9A-9B are substantially similar or identical to the components described above in connection with the trunnion 302 of FIGS. 3A and 3B. As such, those components will not be described in detail again below. Instead, the interested reader is referred to the above corresponding descriptions for a complete written description of the structure and operation of such components.

Figure 4:
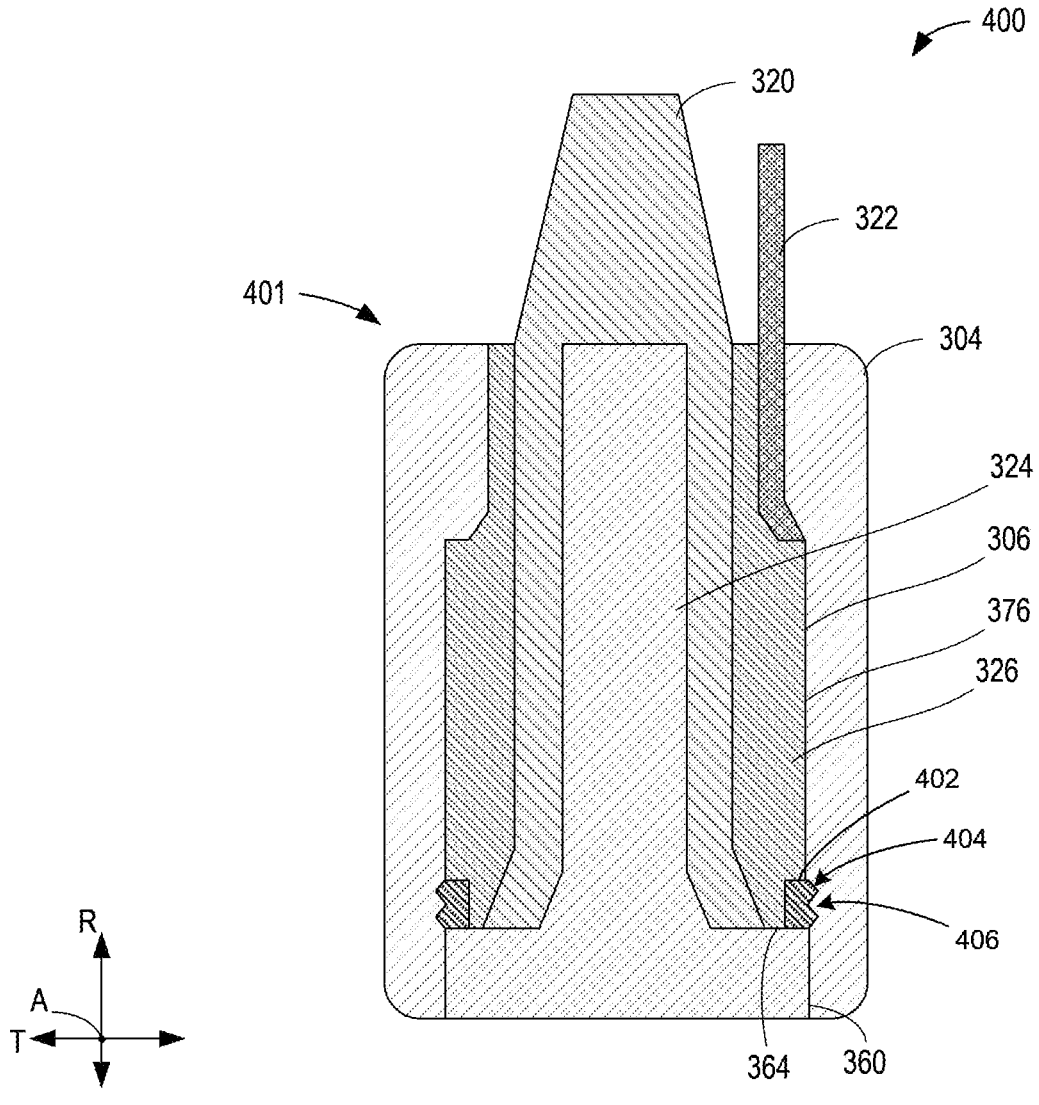
FIG. 4 is a schematic cross-sectional view of another variable pitch blade assembly including another trunnion constructed in accordance with teachings disclosed herein.

FIG. 4 is a cross-sectional side view another variable pitch blade assembly 400 having another example trunnion 401 constructed in accordance with teachings disclosed herein. In some examples, the trunnion 401 implements means for rotating. In some examples, the trunnion 401 implements one of the trunnions 150 of FIG. 1, one of the trunnions 208 of FIG. 2, and/or another trunnion disclosed herein.

The variable pitch blade assembly 400 of FIG. 4 is substantially similar to the variable pitch blade assembly 300 of FIGS. 3A and 3B. Unless otherwise specified, descriptions provided in connection with the trunnion 302 of FIGS. 3A and 3B likewise apply to the trunnion 401 of FIG. 4. Like the trunnion 302 of FIGS. 3A and 3B, the trunnion 401 of FIG. 4 includes the outer sleeve 304, the inner sleeve 324, and the intermediate sleeve 326, which retain the first spar 320 and the second spar 322. However, the trunnion 401 of FIG. 4 includes an example fastener 402 (e.g., coupler, linkage, retention component, etc.). In this example, the fastener 402 is a threaded retaining ring, but the fastener 402 can be another type of fastener in other examples, such as (but not limited to) a nut (e.g., a jam nut and/or other nut), another type of retaining ring, one or more bolts, a snap-fit, etc. In some examples, the fastener 402 implements means for fastening.

The example fastener 402 of FIG. 4 includes a first threaded surface 404, which is an outer surface of the fastener 402 of FIG. 4. In the illustrated example of FIG. 4, the intermediate sleeve 326 includes an opening (e.g., a space, a gap, etc.) in which to receive the fastener 402. For example, the opening can be fabricated into the intermediate sleeve 326. As such, the first threaded surface 404 radially extends from and is aligned relative to the outer surface 376 of the intermediate sleeve 326. In other examples, the inner sleeve 324 can additionally or alternatively include the opening to receive the fastener 402.

Further, in this example, the fastener 402 is attached to the intermediate sleeve 326. More specifically, the fastener 402 is attached to an outer surface and/or a radially inward surface of the intermediate sleeve 326. However, the fastener 402 can be positioned at other radial locations in other examples. The fastener 402 of FIG. 4 is coupled to the inner sleeve 324 but can be integrally formed with the inner sleeve 324 in other examples. In some examples, the fastener 402 can additionally or alternatively be attached to the inner sleeve 324. For example, the fastener 402 can be coupled to the first surface 364 of the inner sleeve 324 and extend radially outward from the first surface 364 of the pedestal 360.

As illustrated in FIG. 4, the inner surface 306 of the outer sleeve 304 includes a second threaded surface 406 that is complementary to the first threaded surface 404. Accordingly, the first threaded surface 404 can mate (e.g., mesh, etc.) with the second threaded surface 406 to secure the intermediate sleeve 326 relative to the outer sleeve 304. For example, the connection of the first threaded surface 404 and the second threaded surface 406 can help to radially retain the inner sleeves 324, 326 and the spars 320, 322 relative to the outer sleeve 304. In other words, the fastener 402 mates the outer sleeve 304 to the intermediate sleeve 326.

It is understood that the fastener 402 of FIG. 4 is by way of example. The variable pitch blade assembly 400 can include an additional or alternative fastener(s) in other examples. Further, the variable pitch blade assembly 800 can include a fastener(s) located at an additional or alternative position(s) relative to the trunnion 401.

Figures 5A, 5B:
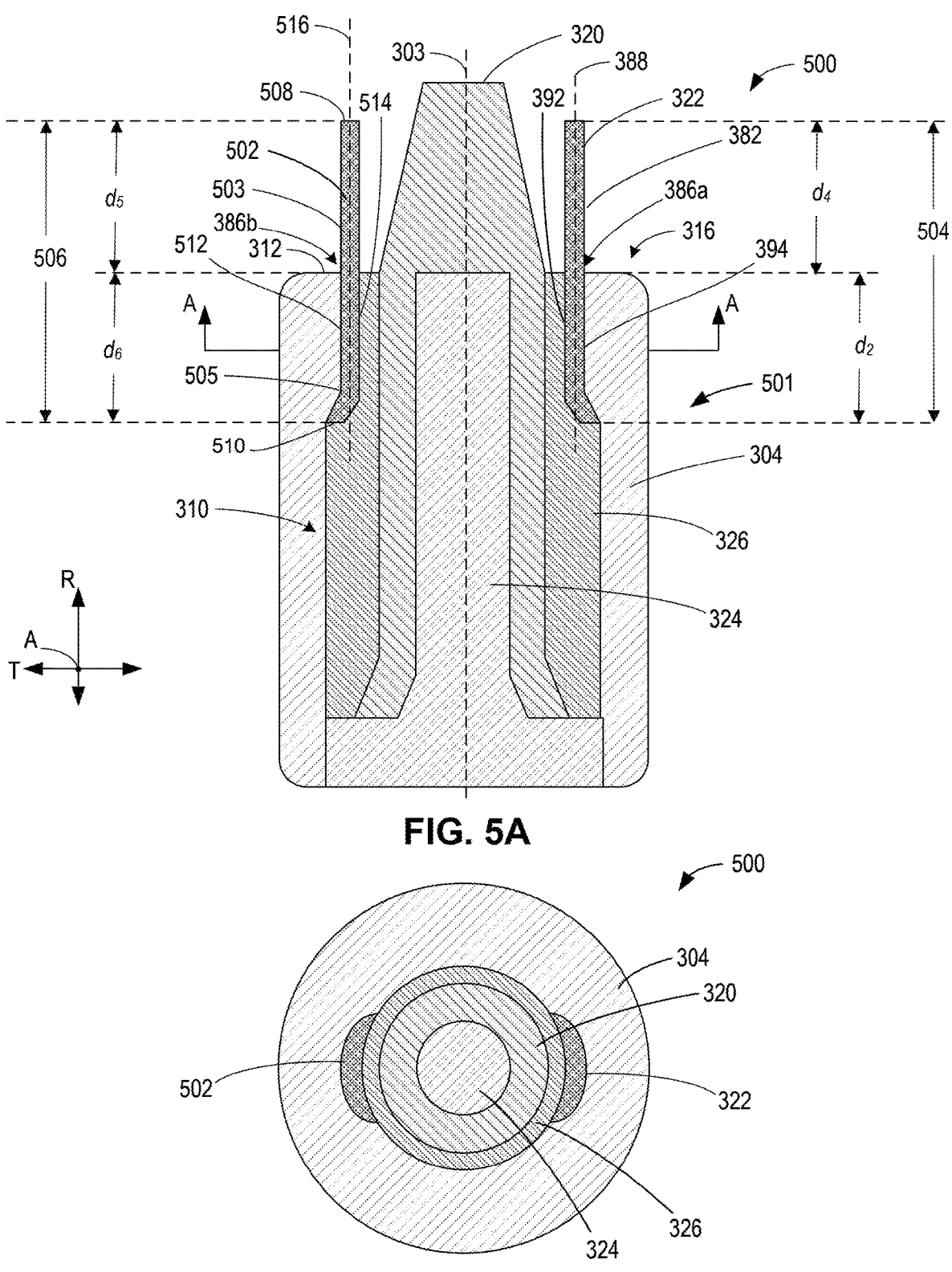
FIG. 5A is a schematic cross-sectional view of another variable pitch blade assembly including another trunnion constructed in accordance with teachings disclosed herein.
FIG. 5B is a schematic cross-sectional view of the variable pitch blade assembly of FIG. 5A along the line A-A.

FIGS. 5A-5B illustrate another variable pitch blade assembly 500 including another example trunnion 501 constructed in accordance with teachings disclosed herein. More specifically, FIG. 5A is a schematic cross-sectional view of the variable pitch blade assembly 500 and FIG. 5B is a top-down cross-sectional view of the variable pitch blade assembly 500 taken along the line A-A of FIG. 5A. In some examples, the trunnion 302 implements means for rotating. In some examples, the trunnion 401 implements one of the trunnions 150 of FIG. 1, one of the trunnions 208 of FIG. 2, and/or another trunnion disclosed herein.

The variable pitch blade assembly 500 of FIGS. 5A-5B is substantially similar to the variable pitch blade assembly 300 of FIGS. 3A and 3B. Unless otherwise specified, descriptions provided in connection with the variable pitch blade assembly 300 of FIGS. 3A and 3B likewise apply to the variable pitch blade assembly 500 of FIGS. 5A and 5B. Like the trunnion 302 of FIGS. 3A and 3B, the trunnion 501 of FIGS. 5A and 5B includes the outer sleeve 304, the inner sleeve 324, and the intermediate sleeve 326, which retain the first spar 320 and the second spar 322. However, the variable pitch blade assembly 500 of FIGS. 5A and 5B also includes an example third spar 502. As discussed above, the first spar 320 is a primary spar configured to mount a primary blade (e.g., a fan blade) to the trunnion 501. In this example, the second spar 322 is a secondary spar, also referred to herein as a splitter spar, configured to mount a first splitter blade to the trunnion 501 and the third spar 502 is another secondary spar configured to mount a second splitter blade to the trunnion 501. In other words, the second and third spars 322, 502 are splitter spars. In other examples, the second spar 322 and/or the third spar 502 can implement a splitter blade. In some examples, the third spar 502 implements means for mounting. In some examples, the third spar 502 implements means for moving air. Examples illustrating trunnions with multiple splitter blades are disclosed in further detail herein in connection with FIGS. 11B-11E.

In the example of FIG. 5B, the first spar 320 is positioned between the second spar 322 and the third spar 502. In other words, the main spar 320 is flanked by the splitter spars 322, 502. The third spar 502 of FIGS. 5A and 5B is similar to the second spar 322. For example, the second and third spars 322, 502 are similar in size and location (e.g., relative to the first spar 320). In particular, in this example, the third spar 502 is the same as the second spar 322, mirrored relative to second spar 322 (e.g., over the first spar 320). However, as discussed in further detail below, the third spar 502 and the second spar 322 can differ in one or more aspects in other examples.

As illustrated in the examples of FIGS. 5A and 5B, the third spar 502 includes a third mounting portion 503 (e.g., spar portion, etc.), which protrudes (e.g., projects, extends, etc.) from the face 316 of the trunnion 302, and a third base 505 (e.g., a base portion, a root, a stem, etc.) disposed in the interior 310 of the outer sleeve 304 to secure (e.g., retain, hold, lock, etc.) the third mounting portion 503 in place relative to the trunnion 501. In some examples, the third mounting portion 503 implements a splitter blade.

The third mounting portion 503 of the third spar 502 is affixed (e.g., held, locked, secured, attached, fastened, etc.) to the trunnion 501 by the third base 505. More specifically, as illustrated in FIG. 5A, the third base 505 is sandwiched (e.g., wedged, interposed, etc.) between the outer sleeve 304 and the intermediate sleeve 326 such that the inner sleeves 324, 326 lock the third base 505 of the second spar 322 within the outer sleeve 304.

In particular, as depicted in the example of FIGS. 5A and 5B, the outer sleeve 304 includes a first slot 386*a* (e.g., the slot 386 of FIGS. 3A and 3B) to hold the second spar 322 and a second slot 386*b* (e.g., a slit, a cavity, an aperture, a groove, etc.) to hold the third spar 502. Like the first slot 386*a*, the second slot 386*b* is recessed into the face 316 of the trunnion 501. The outer sleeve 304 is configured to position the splitter spars 322, 502 with respect to the first spar 320 via the slots 386*a*, 386*b*. As illustrated in FIG. 5B, the third base 505 of the third spar 502 is disposed within the second slot 386*b* of the outer sleeve 304.

As discussed above, the second spar 322 has a longitudinal axis 388 defined along the radial direction R that is laterally offset relative to the first spar 320 and the pitch axis 303. The longitudinal axis 388 is a first longitudinal axis and will hereinafter be referred to as such. As illustrated in FIG. 5A, the third spar 502 has a second longitudinal axis 516 defined along the radial direction R that is laterally offset relative to the pitch axis 303.

As illustrated in FIGS. 5A and 5B, the second spar 322 is laterally offset from the first spar 320 in a first direction (e.g., a first lateral direction). Further, the third spar 502 is laterally offset from the first spar 320 in a second direction (e.g., a second lateral direction). In this example, the first direction is substantially parallel relative to the second direction, but opposite from the second direction (e.g., the first and second directions are opposite directions). In other words, the second spar 322 is located on a first side of the first spar 320 and the third spar 502 is located on a second side of the first spar 320 that is opposite the first side. Stated differently, the trunnion 501 includes splitter spar 322, 502 on multiple sides of the main spar 320. In other examples, the second spar 322 and the third spar 502 can be offset relative to one another. An example of such a trunnion is further described in connection with at least FIGS. 6A-6B (see also FIGS. 11B-11E).

In the illustrated example of FIGS. 5A and 5B, the third spar 502 is substantially the same size (e.g., in terms of thickness, radial length, etc.) as the second spar 322. In other examples, the third spar 502 can have a different size than the second spar 322. For example, as shown in the example of FIG. 5A, the second spar 322 has a first radial length 504 and the third spar 502 has a second radial length 506 that is substantially similar (within +/−10 percent) as the first radial length 504 of the second spar 322. In other examples, the second radial length 506 can be larger or smaller than the first radial length 504.

In the illustrated example of FIGS. 5A and 5B, the third spar 502 extends from the face 316 of the trunnion 501 a fifth distance (e.g., a fifth radial distance, denoted $d_5$) defined in the radial direction R between the first transverse surface 312 of the trunnion 501 and a radially outer-most surface 508 of the third spar 502. Further, the third spar 502 extends into the interior 310 of the outer sleeve 304 a sixth distance (a sixth radial distance, denoted $d_6$) defined in the radial direction R between the first transverse surface 312 and a distal surface 510 of the third spar 502, which is a radially inner-most surface of the third spar 502. In this example, the fifth distance $d_5$ is the same (within +/−10 percent) as the fourth distance $d_4$ of the second spar 322. Further, the sixth distance de is the same (within +/−10 percent) as the second distance $d_2$ of the second spar 322. However, the fifth distance $d_5$ and/or the sixth distance de can differ in other examples. For example, the third spar 502 can be radially longer or shorter than the second spar 322 and/or offset in the radial direction R relative to the second spar 322.

In some examples, the third spar 502 can have a different peripheral length (e.g., relative to or about the pitch axis 303) and/or a different thickness relative to the second spar 322. For example, a distance between the first surface 392 and the second surface 394 of the second spar 322 defines a thickness of the second spar 322. Further, a distance between a third surface 512 of the third spar 502 and a fourth surface 514 of the third spar 502 defines a thickness of the third spar 502. The thicknesses of the spars 322, 502 of FIGS. 5A and 5B are substantially the same (within +/−10 percent) but can be different in other examples.

In some examples, a size of the second spar 322 is at least partially dependent on a size of the first splitter blade and a size of the third spar 502 is at least partially dependent on a size of the second splitter blade. For example, stresses (e.g., thermal, mechanical, etc.) on the second slitter blade can be different from stresses on the first splitter based on whether a respective splitter blade is on a pressure side of the main blade or a suction side of the main blade. Accordingly, the second splitter blade can have a different size (e.g., a different span, a different chord length, a different thickness, etc.) relative to the first splitter blade. Thus, the spars 322, 502 can be larger or smaller based on a larger or smaller splitter blade to be mounted to the spars 322, 502.

Figures 6A, 6B:
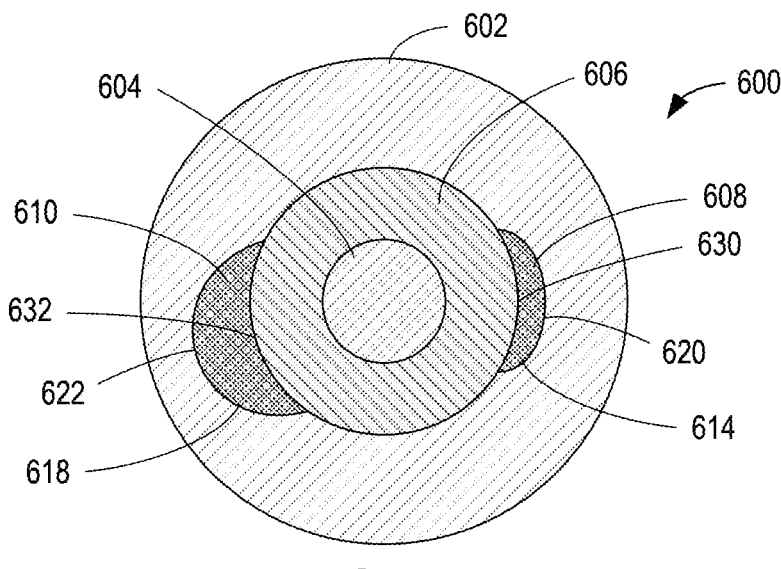
FIG. 6A is a schematic cross-sectional view of another variable pitch blade assembly including another trunnion constructed in accordance with teachings disclosed herein.
FIG. 6B is a schematic cross-sectional view of the variable pitch blade assembly of FIG. 6A along the line A-A.

FIGS. 6A-6B illustrate another variable pitch blade assembly 600 including another example trunnion 601 constructed in accordance with teachings disclosed herein. More specifically, FIG. 6A is a schematic cross-sectional view of the variable pitch blade assembly 600 and FIG. 6B is a top-down cross-section view of the variable pitch blade assembly 600 taken along the line A-A of FIG. 6A. In some examples, the trunnion 601 implements means for rotating. In some examples, the trunnion 601 implements one of the trunnions 150 of FIG. 1, one of the trunnions 208 of FIG. 2, and/or another trunnion disclosed herein. The trunnion 601 of FIGS. 6A and 6B defines a pitch axis (e.g., the pitch axis 303).

The variable pitch blade assembly 600 of FIGS. 6A and 6B is similar to the variable pitch blade assemblies 300, 500 of FIGS. 3A, 3B, 5A, 5B. For example, the trunnion 601 of FIGS. 6A-6B includes an outer sleeve 602 (e.g., the outer sleeve 304 of FIGS. 3A-5B), an inner sleeve 604 (e.g., the inner sleeve 324 of FIGS. 3A-5B), which are configured to mount a first spar 606 (e.g., the first spar 320 of FIGS. 3A-5B), and a second spar 608 (e.g., the second spar 322 of FIGS. 3A-5B) to the trunnion 601. In some examples, the outer sleeve 602 implements means for housing. In some examples, the inner sleeve 604 implements means for securing. Further like, the variable pitch blade assembly 500 of FIGS. 5A-5B, the variable pitch blade assembly 600 of FIGS. 6A-6B includes a third spar 610 (e.g., the third spar 502 of FIGS. 5A-5B). In some examples, the first spar 606 and/or the second spar 608, and/or the third spar 610 implements means for mounting. However, the trunnion 601 of FIGS. 6A and 6B does not include an intermediate sleeve. The first spar 606 is a primary spar configured to mount a primary blade to the trunnion 601. In some examples, the second and/or third spars 608, 610 are spitter spars configured to mount splitter blades to the trunnion 601. In some examples, the second and/or third spars 608, 610 can implement splitter blades.

The first spar 606 of FIGS. 6A and 6B is substantially similar to the first spar 320 of FIGS. 3A-5B. For example, the first spar 606 includes a mounting portion (e.g., the first mounting portion 330 of FIGS. 3A-5B) to mount a primary blade to the trunnion 601 and a base (e.g., the first base 332 of FIGS. 3A-5B) to secure the first mounting portion 330. Further, the inner sleeve 604 of FIGS. 6A and 6B is similar to the inner sleeve 324 of FIGS. 3A-5B. For example, the inner sleeve 604 includes the pedestal 360 and the column 362 of FIGS. 3A-5B. However, it is understood that the first spar 606 and/or the inner sleeve 604 can differ in other examples.

As illustrated in FIG. 6A, the second spar 608 includes a second mounting portion 612 and a second base 614, which is configured to secure the second mounting portion 612 to the trunnion 601. Similarly, the third spar 610 includes a third mounting portion 616 and a third base 618, which is configured to secure the third mounting portion 616 to the trunnion 601. In some examples, the second mounting portion 612 and/or the third mounting portion 616 are configured to mount second and third splitter blades, respectively, to the trunnion 601. In other examples, the second mounting portion 612 and/or the third mounting portion 616 implement the second and third splitter blades, respectively. In some examples, the second spar 608 and/or the third spar 610 implements means for moving air. Moreover, the second spar 608 includes a first inner surface 620 and the third spar 610 includes a second inner surface 622.

The bases 614, 618 of the trunnion 601 of FIGS. 6A and 6B are disposed between the first spar 606 and the outer sleeve 602. More specifically, each base 614, 618 is adjacent to and abuts an outer surface (e.g., the outer surface 342) of the first spar 606 and an inner surface 622 of the outer sleeve 304. In other words, the splitter spars 608, 610 are sandwiched between the outer sleeve 304 and the first spar 606, which is secured by the inner sleeve 604 and the outer sleeve 602.

In the illustrated example of FIG. 6A, the variable pitch blade assembly 600 includes an example spacer 626 (e.g., a spacer plie, an insert, etc.) between the first spar 606 and the splitter spars 608, 610. More specifically, the spacer 626 is positioned between the outer surface 342 of the first spar 606 and the inner surfaces 620, 622 of the splitter spars 608, 610.

The spacer 626 is configured to separate the splitter spars 608, 610 from the main spar 606 to enable separation of the splitter blades from the main blade. In this example, the spacer 626 is circular and circumscribes the pitch axis 303. In other examples, the trunnion 601 can include more than one spacer. In some examples, the spacer 626 implements means for spacing.

In some examples, the spacer 626 can be formed of a metal or a composite and inserted between the first spar 606 and the splitter spar 608, 610. In some examples, the spacer 626 can include a build-up of a composite material in between the first spar 606 and the splitter spar 608, 610. For example, the spacer 626 can be fabricated with the fan blade and/or the splitter blades. For example, packs (e.g., bundles, etc.) of a composite material can be inserted between a fiber material used to form the blades to generate the spacer 626. However, the spacer(s) 626 can include additional or alternative materials in other examples.

Like the splitter spars 322, 502 of FIGS. 3A-3B, 4, and/or 5A-5B, each of the splitter spars 608, 610 of FIGS. 6A and 6B include a respective lip 628a, 628b (e.g., a skirt, a rim, an edge, etc.). As illustrated in FIG. 6A, the inner surfaces 620, 622 of the splitter spars 608, 610 have fourth cross-sectional profile extending along the radial direction R that follows the first cross-sectional profile of the inner surface 334 of the first spar 606. Thus, the bases 614, 618 of the splitter spars 608, 610 include curve or angle at a radially inward portion of the bases 614, 618 to define the lips 628a, 628b. That is, while the lips 628a, 628b of FIG. 6A are straight (e.g., linear), the lips 628a, 628b can include curvature in other examples.

In this example, the second spar 608 has a different size than the third spar 610. As illustrated in FIG. 6B, the second spar 608 has a first thickness defined between the first inner surface 620 of the second spar 608 and an outer surface 630 of the second spar 608. Similarly, the third spar 610 has a second thickness defined between the second inner surface 622 of the third spar 610 and an outer surface 632 of the third spar 610. In this example, the first thickness of the second spar 608 is smaller than the second thickness of the third spar 610. In other examples, the first thickness can be larger or the same as the second thickness.

Further, the second spar 608 and the third spar 610 are asymmetrically located with respect to the first spar 606. As illustrated in FIGS. 6B, the second spar 608 is laterally offset from the first spar 606 in a first direction (e.g., a first lateral direction). Further, the third spar 610 is laterally offset from the first spar 606 in a second direction (e.g., a second lateral direction). In this example, the first direction is non-parallel relative to the second direction. As such, the trunnion 601 includes splitter spars 608, 610 that are located on different sides of the main spar 606 but offset relative to one another.

Figure 7:
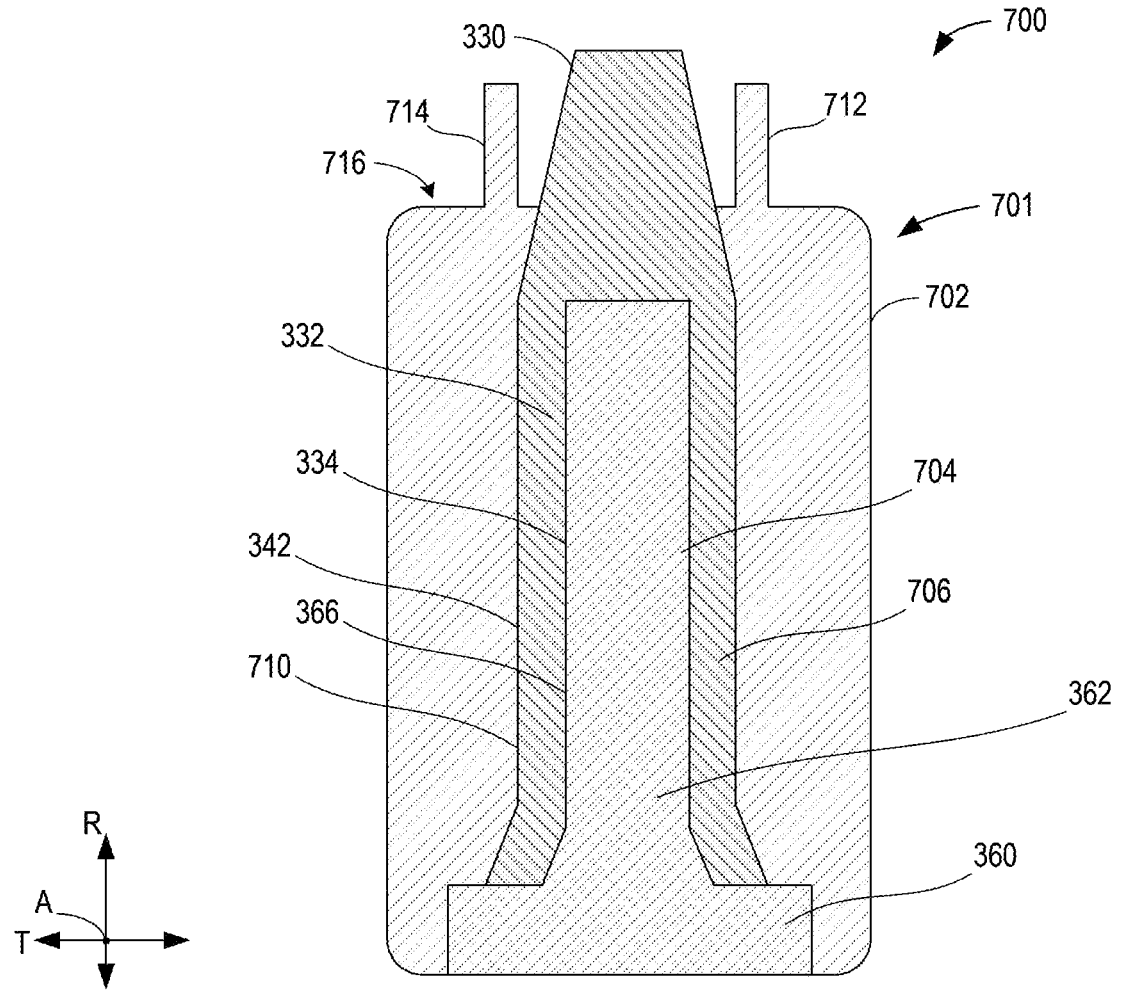
FIG. 7 is a schematic cross-sectional view of another variable pitch blade assembly including another trunnion constructed in accordance with teachings disclosed herein.

FIG. 7 is a schematic cross-sectional view of another variable pitch blade assembly 700 including another example trunnion 701 constructed in accordance with teachings disclosed herein. In some examples, the trunnion 701 implements means for rotating. In some examples, the trunnion 701 implements one of the trunnions 150 of FIG. 1, one of the trunnions 208 of FIG. 2, and/or another trunnion disclosed herein.

The trunnion 701 of FIG. 7 includes an outer sleeve 702, an inner sleeve 704, which are configured to mount a first spar 706 for mounting a primary blade to the trunnion 701. In some examples, the outer sleeve 702 implements means for housing. In some examples, the inner sleeve 704 implements means for securing. In some examples, the first spar implements means for mounting. The inner sleeve 704 of FIG. 7 is substantially similar to the inner sleeves 324, 604 of FIGS. 3A-5B, 6A-6B. For example, the inner sleeve 704 includes the pedestal 360 and the column 362 of FIGS. 3A-5B, 6A-6B. Further, the first spar 706 of FIG. 7 is substantially similar to the first spars 320, 606 of FIGS. 3A-3B, 4, 5A-5B, 6A-6B. For example, the first spar 706 includes the first mounting portion 330 and the first base 332 of FIGS. 3A-3B, 4, 5A-5B, 6A-6B. However, it is understood that the inner sleeve 704 and/or the first spar 706 can differ in other examples. Like the trunnion 601 of FIGS. 6A and 6B, the trunnion 701 of FIG. 7 omits an intermediate sleeve.

As illustrated in FIG. 7, the first spar 706 is sandwiched (e.g., wedged, interfaced, etc.) between the outer sleeve 702 and the inner sleeve 704 of the trunnion 701. Specifically, the inner surface 334 of the first spar 706 is adjacent to and abuts the outer surface 366 of the inner sleeve 704 and the outer surface 342 of the first spar 706 is adjacent to and abuts an inner surface 710 of the outer sleeve 702. Thus, the outer sleeve 702 and the inner sleeve 704 together secure the first base 332 of the first spar 706 relative to the trunnion 701 to enable the first base 332 to secure the first mounting portion 330 relative to the trunnion 701.

In the illustrated example of FIG. 7, the trunnion 701 includes an example first splitter extension 712 and an example second splitter extension 714, each of which extend from a face 716 (e.g., the face 316 of FIG. 3A) of the trunnion 701. The splitter extensions 712, 714 are formed as part of outer sleeve 702. In some examples, the splitter extensions 712, 714 are integrally formed as part of the outer sleeve 702. In some examples, the splitter extensions 712, 714 are fabricated (e.g., machined) from the outer sleeve 702. While two splitter extensions 712, 714 are illustrated in FIG. 7, the trunnion 701 can include more or less splitter extensions 712, 714 in other examples.

In some examples, the splitter extensions 712, 714 implement splitter blades. In particular, in this example, the first splitter extension 712 implements a first splitter blade and the second splitter extension 714 implements a second splitter blade. Thus, in this example, the splitter blades are formed of a metal material. As illustrated in FIG. 7, the splitter blades extend radially outward from the outer sleeve 702.

In other examples, one or more of the splitter extensions 712, 714 can implement a respective splitter spar. For example, the first splitter extension 712 can implement a second spar for a first splitter blade. In some such examples, the second spar can be formed of a metal material. Further, the first splitter blade can be added to the first splitter extension 712 to form the first splitter blade. For example, a composite material can be used to fabricate the first splitter blade around the first splitter extension 712 to generate an airfoil shape. Additionally or alternatively, the second splitter extension 714 can implement a third spar for a second splitter blade.

In some examples, the first splitter extension 712 and/or the second splitter extension 714 implements means for mounting. In some examples, the first splitter extension 712 and/or the second splitter extension 714 implements means for moving air.

Figures 8A, 8B, 8C:
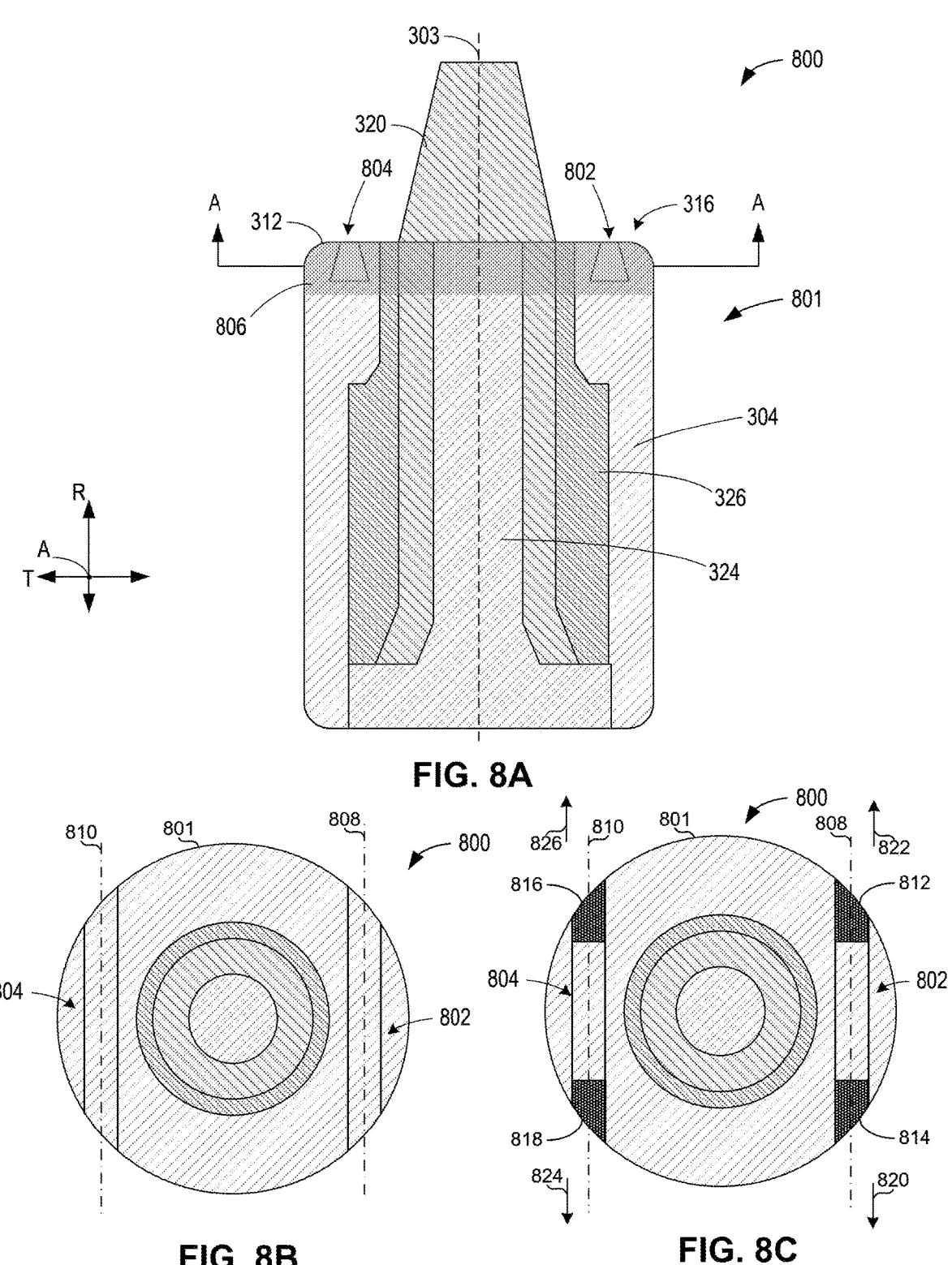
FIG. 8A is a schematic cross-sectional view of another variable pitch blade assembly including another trunnion constructed in accordance with teachings disclosed herein.
FIG. 8B is a schematic cross-sectional view of the variable pitch blade assembly of FIG. 8A along the line A-A.
FIG. 8C is another schematic cross-sectional view of the variable pitch blade assembly of FIG. 8A along the line A-A.

FIGS. 8A-8C illustrate another variable pitch blade assembly 800 including another example trunnion 801 constructed in accordance with teachings disclosed herein. More specifically, FIG. 8A is a schematic cross-sectional view of the variable pitch blade assembly 800 and FIGS. 8B and 8C are top-down views of the variable pitch blade assembly 800 along the line A-A of FIG. 8A. In some examples, the trunnion 302 implements means for rotating. In some examples, the trunnion 801 implements one of the trunnions 150 of FIG. 1, one of the trunnions 208 of FIG. 2, and/or another trunnion disclosed herein.

The variable pitch blade assembly 800 of FIGS. 8A-8C is similar to the variable pitch blade assembly 300, 500 of FIGS. 3A, 3B, 5A, 5B. Unless otherwise specified, descriptions provided in connection with the trunnions 302, 501 of FIGS. 3A, 3B, 5A, 5B likewise apply to the variable pitch blade assembly 800 of FIGS. 8A-8C. Like the trunnions 302, 501 of FIGS. 3A, 3B, 5A, 5B, the trunnion 801 of FIGS. 8A-8C includes the outer sleeve 304, the inner sleeve 324, and the intermediate sleeve 326, which retain the first spar 320.

However, unlike the trunnions 302, 501 of FIGS. 3A, 3B, 5A, 5B, the trunnion 801 of FIGS. 8A-8B includes dovetail slots in which splitter blades can be mounted. In this example, the trunnion 801 includes a first dovetail slot 802 and a second dovetail slot 804. The first dovetail slot 802 can be configured to receive a first splitter blade to the trunnion 801 while the second dovetail slot 804 can be configured to receive a second splitter blade. For example, the splitter blades can include dovetails having a shape that is complementary with the dovetail slots 802, 804 such that the dovetails can be inserted into the dovetail slots 802, 804. In some examples, the trunnion 801 can include more or less dovetails. In other words, the trunnion 801 of FIGS. 8A-8C omit splitter spars. In other examples, the trunnion 801 can include one or more splitter spars in addition to the dovetail slot(s) 802, 804.

The dovetail slots 802, 804 can be fabricated (e.g., machined) into the first transverse surface 312 of the outer sleeve 304. In this example, the first dovetail slot is located on a first side of the outer sleeve 304 and the second dovetail slot 804 is located on a second side of the outer sleeve 304. That is, the dovetail slots 802, 804 are laterally offset relative to the pitch axis 303. In particular, the first dovetail slot 802 is laterally offset from the first spar 320 in a first lateral direction and the second dovetail slot 804 is laterally offset from the first spar 320 in a second lateral direction that is different than the first lateral direction.

As illustrated, the trunnion 801 of FIGS. 8A-8C includes an example retention cap 806. The retention cap 806 is disposed on the face 316 of the trunnion 801 to help retain the splitter blades relative to the trunnion 801. For example, the dovetails of the splitter blades can be positioned in the respective dovetail slots 802, 804, and the retention cap 806 can be positioned to help retain splitter blades relative to the dovetail slots 802, 804 to prevent the splitter blades from sliding within the slots 802, 804. In some examples, the retention cap 806 implements means for retaining. In some examples, the retention cap 806 and the first dovetail slot 802 and/or the second dovetail slot 804 implements means for mounting. In some examples, the retention cap 806 includes a metal material, but can include another material in additional or alternative examples.

Figures 11A, 11B, 11C, 11D, 11E:
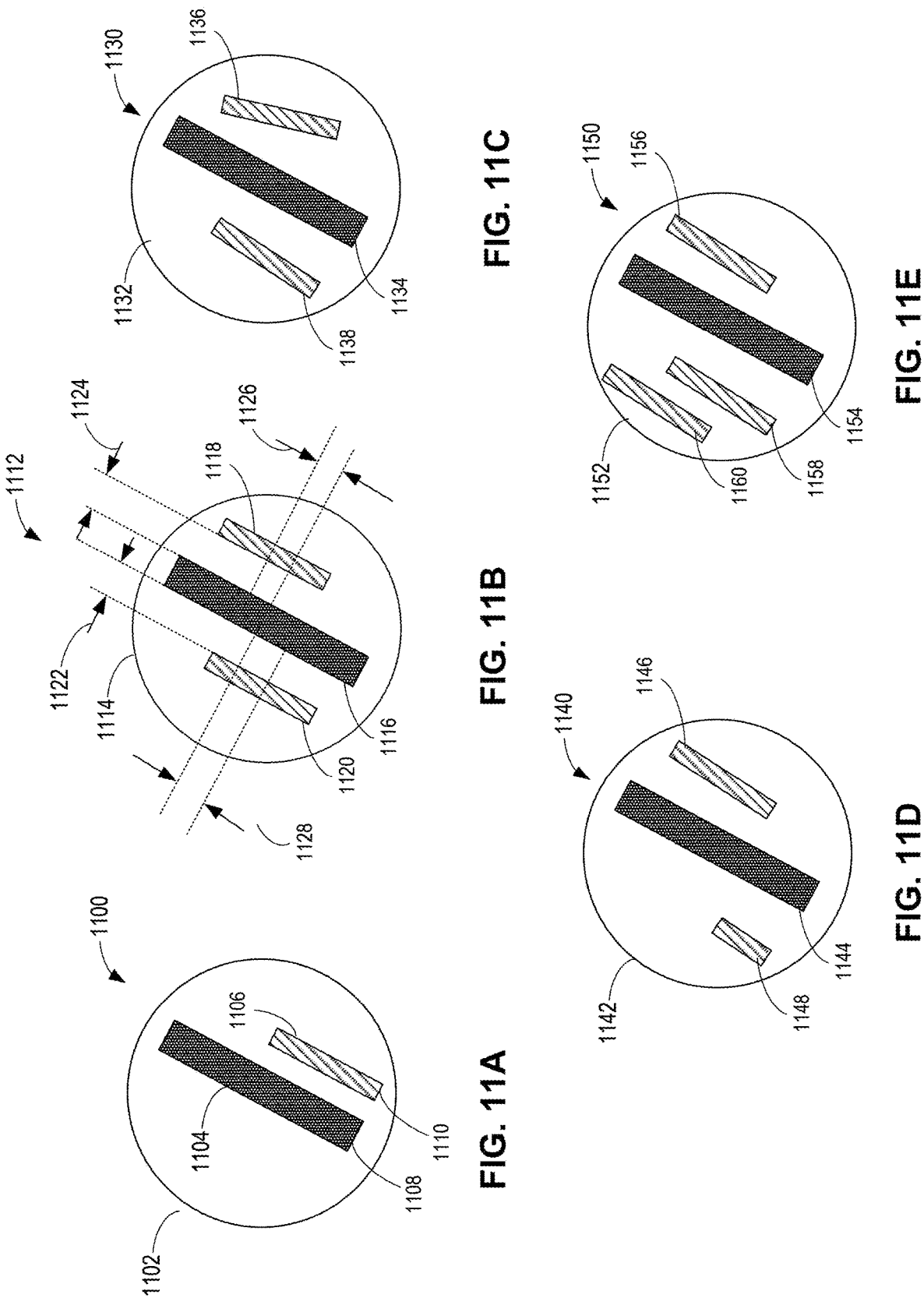
FIG. 11A is a schematic, plan view of another variable pitch blade assembly.
FIG. 11B is a schematic, plan view of another variable pitch blade assembly.
FIG. 11C is a schematic, plan view of another variable pitch blade assembly.
FIG. 11D is a schematic, plan view of another variable pitch blade assembly.
FIG. 11E is a schematic, plan view of another variable pitch blade assembly.

As illustrated in FIGS. 8B and 8C, the first dovetail slot 802 defines a first centerline 808 and the second dovetail slots 804 defines a second centerline 810. In this example, the first and second centerlines 808, 810 are substantially parallel. In other examples, however, the centerlines 808, 810 can be non-parallel. In other words, while the dovetail slots 802, 804 of FIGS. 8A-8C are substantially parallel relative to one another, one or more of the dovetail slots 802, 804 can be angled in other examples (FIG. 11C).

As shown in FIG. 8C, the variable pitch blade assembly 800 can also include bumpers. For example, the variable pitch blade assembly 800 of FIG. 8C includes a first bumper 812 and a second bumper 814, which are positioned within the first dovetail slot 802, and a third bumper 816 and a fourth bumper 818, which are positioned within the second dovetail slot 804. The bumpers 812, 814, 816, 818 can help to retain the splitter blades within the respective dovetail slots 802, 804. The bumpers 812, 814, 816, 818 can help to position the splitter blades relative to the first spar 320 and, in turn, relative to the primary blade. In some examples, one or more of the bumpers 812, 814, 816, 818 implements means for positioning.

For example, the first bumper 812 has a first length defined along the first centerline 808 while the second bumper 814 as a second length defined along the first centerline 808. In this example, the first length is substantially the same (within +/−10 percent) as the second length. As such, the first splitter blade is positionable in a center of the first dovetail slot 802. In other examples, the first length of the first bumper 812 can be larger than the second length of the second bumper 814 such that the first splitter blade can be positioned offset from the center in a first direction 820 defined along the first centerline 808. In yet other examples, the first length of the first bumper 812 can be smaller than the second length of the second bumper 814 such that the first splitter blade can be positioned offset from the center in a second direction 822 defined along the first centerline 808, which is opposite the first direction 820.

Moreover, the third bumper 816 has a third length defined along the second centerline 810 while the fourth bumper 818 as a fourth length defined along the second centerline 810. In this example, the third length is substantially the same (within +/−10 percent) as the fourth length. As such, the second splitter blade is positionable in a center of the second dovetail slot 804. In other examples, the third length of the third bumper 816 can be larger than the fourth length of the fourth bumper 818 such that the second splitter blade can be positioned offset from the center in a third direction 824 defined along the second centerline 810. In yet other examples, the third length of the third bumper 816 can be smaller than the fourth length of the fourth bumper 818 such that the second splitter blade can be positioned offset from the center in a fourth direction 826 defined along the second centerline 810, which is opposite the third direction 824.

Further, while the first and third lengths of the first and third bumpers 812, 816 are the same in FIG. 8C, the first length can differ from the third length in other examples such that the splitter blades are offset in different directions (illustrated in FIGS. 11B-11E). Similarly, the second and fourth lengths of the second and fourth bumpers 814, 818 are the same in FIG. 8C, but can differ in other examples.

Figure 9:
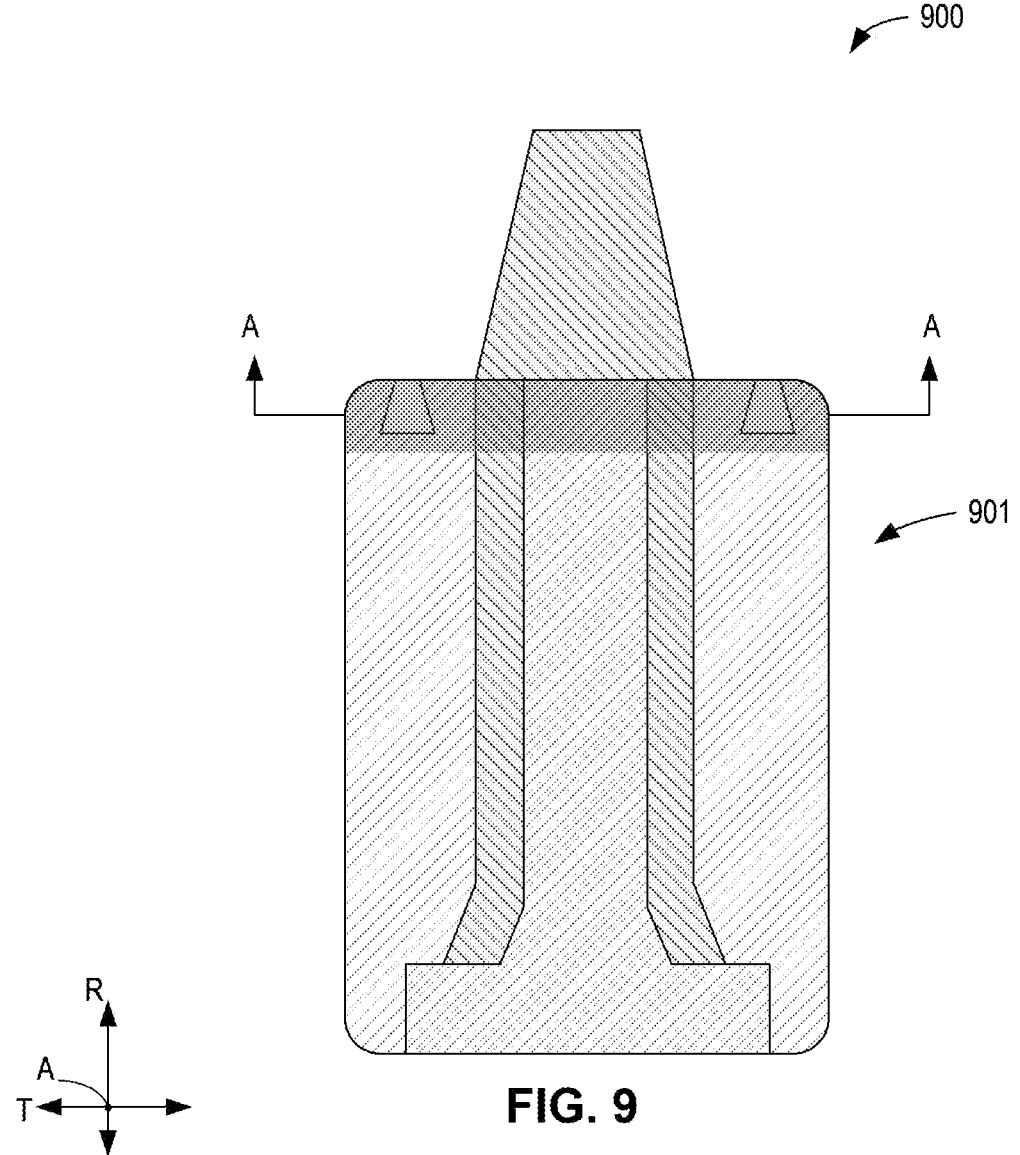
FIG. 9 is a schematic cross-sectional view of another variable pitch blade assembly including another trunnion constructed in accordance with teachings disclosed herein.

FIG. 9 is a schematic cross-sectional view of another variable pitch blade assembly 900 including another example trunnion 901 constructed in accordance with teachings disclosed herein. In some examples, the trunnion 901 implements means for rotating. The trunnion 901 of FIG. 9 is substantially similar to the trunnion 801 of FIGS. 8A-8C. However, like the trunnion 501 of FIGS. 5A and 5B, the trunnion 901 of FIG. 9 omits an intermediate sleeve.

Example variable pitch blade assemblies 300, 400, 500, 600, 700, 800, 900 disclosed above have a variety of features. Although each variable pitch blade assembly 300, 400, 500, 600, 700, 800, 900 disclosed above has certain features, it should be understood that it is not necessary for a particular feature of one example variable pitch blade assembly 300, 400, 500, 600, 700, 800, 900 to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features. Features of the example variable pitch blade assemblies 300, 400, 500, 600, 700, 800, 900 disclosed above may be combined, divided, re-arranged, omitted, eliminated, and/or implemented in any other way.

Figure 10:
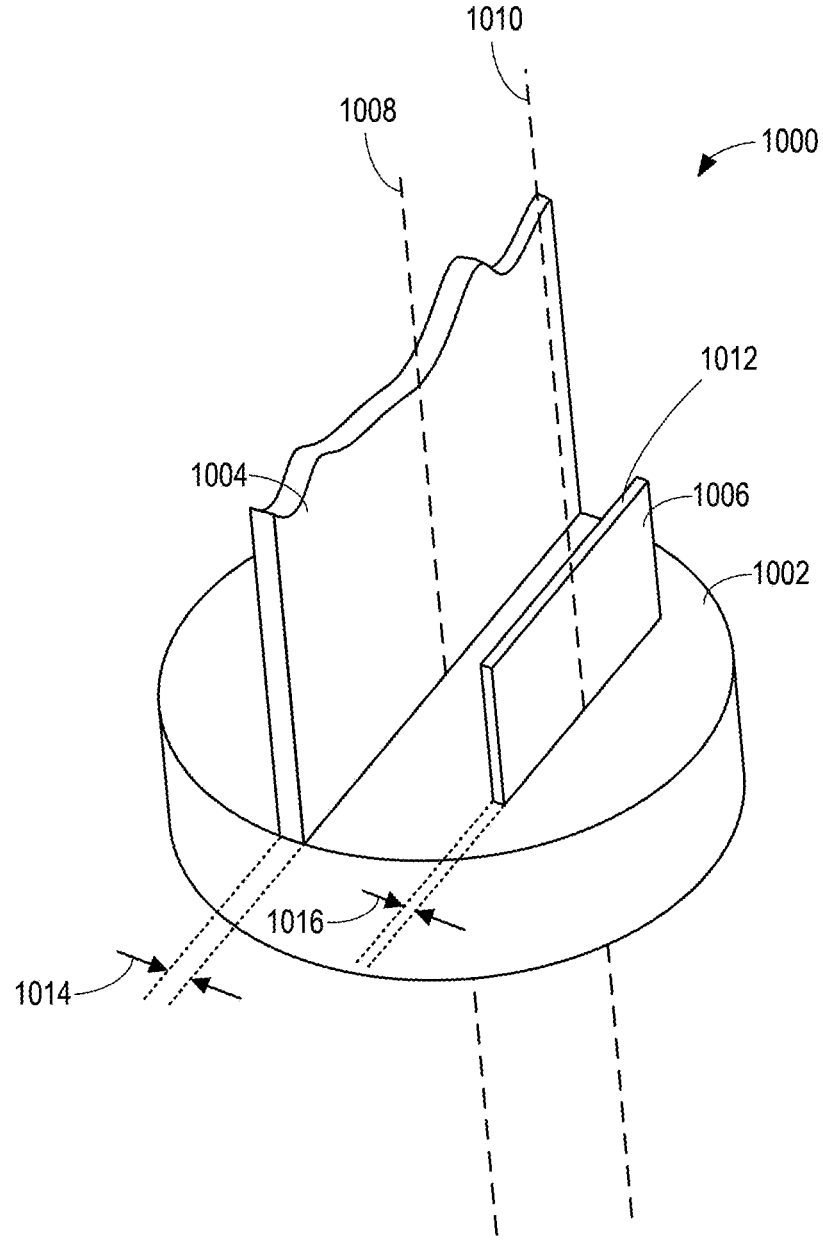
FIG. 10 is a schematic illustration of another variable pitch blade assembly constructed in accordance with teachings disclosed herein.

FIG. 10 is a schematic illustration of an example variable pitch blade assembly 1000, including a trunnion 1002 coupled to a fan blade 1004 (e.g., one of the fan blades 146 of FIG. 1, one of the fan blades 204 of FIG. 2, etc.) and splitter blade 1006 (e.g., one of the splitter blades 148 of FIG. 1, one of the splitter blades 206 of FIG. 2, etc.). The trunnion 1002 can be implemented by one of the trunnions 150 of FIG. 1, one of the trunnions 208 of FIG. 2, the trunnion 302 of FIGS. 3A-3B, the trunnion 401 of FIG. 4, and/or another trunnion configured in accordance with teachings disclosed herein.

The fan blade 1004 has an example pitch axis 1008. The splitter blade 1006 has an example second longitudinal axis 1010 that is laterally offset from the pitch axis 1008. The second longitudinal axis 1010 extends along a spanwise direction of the splitter blade 1006. Additionally or alternatively, the splitter blade 1006 is spaced apart from (e.g., in a circumferential direction) the fan blade 1004. Each of the fan blade 1004 and the splitter blade 1006 are coupled to or include spars. For example, the fan blade 1004 includes a first spar (not shown in FIG. 10) positioned in an interior (e.g., within an airfoil) of the fan blade 1004. The first spar extends along the pitch axis 1008. Further, the splitter blade 1006 includes a second spar (not shown in FIG. 10) positioned in an interior of the splitter blade 1006. The second spar extends along the second longitudinal axis 1010. In some examples, the first and second spars include a same material. In some examples, the first spar includes a first material and the second spar includes a second material different from the first material. For example, the first material or the second material includes metal or a polymer composite.

The fan blade 1004 extends a first distance along the pitch axis 1008. Further, the splitter blade 1006 extends a second distance along the second longitudinal axis 1010. The splitter blade 1006 includes an example tip 1012 that is distal from the trunnion 1002. As shown in FIG. 10, the second distance is less than the first distance. Put differently, the fan blade 1004 and the splitter blade 1006 include different heights. The fan blade 1004 includes a first thickness 1014 and the splitter blade 1006 includes a second thickness 1016 that is less than the first thickness 1014. In the example of FIG. 10, the fan blade 1004 is substantially parallel to the splitter blade 1006.

FIGS. 11A-11E are schematic, plan views of example variable pitch blade assemblies constructed in accordance with teachings disclosed herein. FIG. 11A is an example first assembly 1100 including a trunnion 1102, a fan blade 1104, and a splitter blade 1106. The first assembly 1100 of FIG. 11A is similar to variable pitch blade assembly 1000 of FIG. 10. However, in the first assembly 1100 of FIG. 11A, first and second leading edges 1108, 1110 of the fan blade 1104 and the splitter blade 1106, respectively, are aligned. For example, the first leading edge 1108 of the fan blade 1104 is substantially coplanar (within +/−5 degrees) with the leading edge 1110 of the splitter blade 1106.

FIG. 11B is an example second assembly 1112 including an example trunnion 1114, an example fan blade 1116, and an example first splitter blade 1118. The second assembly 1112 of FIG. 11B is similar to the variable pitch blade assembly 1000 of FIG. 10. For example, the first splitter blade 1118 has the second thickness of the splitter blade 1006 of FIG. 10. However, the second assembly 1112 of FIG. 11B includes another example splitter blade 1120 ("second splitter blade 1120"). The second splitter blade 1120 is coupled to the trunnion 1114. In the example of FIG. 11B, the fan blade 1116 is positioned between the first splitter blade 1118 and the second splitter blade 1120. Put differently, the main fan blade 1116 is flanked by splitter blades 1118, 1120.

In this example, the second splitter blade 1120 is similar to the splitter blade 1006 (e.g., being a secondary blade having a different size than the fan blade 1004). The second splitter blade 1120 of FIG. 11B includes a third thickness that is substantially the same (within +/−10 percent) as the second thickness 1016 (FIG. 10). In other examples, the third thickness of the second splitter blade 1120 can be up to +/−35 percent of the second thickness. For example, stresses (e.g., thermal, mechanical, etc.) on the second splitter blade 1120 can be different from stresses on the first splitter blade 1118 based on whether a respective fan blade is on a pressure side of the main blade 1116 or a suction side of the main blade 1116.

The second splitter blade 1120 is laterally offset from the fan blade 1116. As such, the second splitter blade 1120 includes a pitch axis that is laterally offset from a pitch axis of the fan blade 1116 (e.g., the pitch axis 1008). The second splitter blade 1120 is spaced apart from the fan blade 1116 by a third distance 1122 (e.g., in a first lateral direction). Further, the first splitter blade 1118 is spaced apart from the fan blade 1116 by a fourth distance 1124 (e.g., in the first lateral direction). In this example, the third distance 1122 is substantially the same (within +/−1 centimeter (cm)) as the fourth distance 1124. In other examples, the third distance 1122 is different (within +/−7 cm) from the fourth distance 1124 (e.g., based on whether a respective splitter blade 1118, 1120 is on the pressure side or the suction side of the main blade 1116).

Further, the splitter blades 1118, 1120 are laterally offset from the fan blade 1116 in a second lateral direction different from the first lateral direction. In this example, the second lateral direction is substantially perpendicular to the first lateral direction. In some examples, the second lateral direction is positioned at an angle (e.g., 45 degrees, 60 degrees, etc.) relative to the first lateral direction. As shown in FIG. 11B, the first splitter blade 1118 is laterally offset from the fan blade 1116 by a fifth distance 1126 (e.g., in the second lateral direction). Further, the second splitter blade 1120 is laterally offset from the fan blade 1116 by a sixth distance 1128 (e.g., in the second lateral direction). In the example of FIG. 11B, the fifth distance 1126 is different from (e.g., greater than) the sixth distance 1128. In some examples, the fifth distance 1126 is substantially the same as the sixth distance 1128.

FIG. 11C is an example third assembly 1130 including an example trunnion 1132, an example fan blade 1134, an example first splitter blade 1136, and an example second splitter blade 1138. The third assembly 1130 of FIG. 11C is similar to the second assembly 1112 of FIG. 11B. However, in the third assembly 1130 of FIG. 11C, the first splitter blade 1136 is angularly offset relative to the fan blade 1134. In some examples, the first splitter blade 1136 is angularly offset relative to the second splitter blade 1138. In some examples, the second splitter blade 1138 is angularly offset relative to the fan blade 1134.

FIG. 11D is an example fourth assembly 1140 including an example trunnion 1142, an example fan blade 1144, an example first splitter blade 1146, and an example second splitter blade 1148. The fourth assembly 1140 of FIG. 11D is similar to the second assembly 1112 of FIG. 11B. However, in the fourth assembly 1140 of FIG. 11D, the second splitter blade 1148 includes a chord length that is shorter than a chord length of the first splitter blade 1146 (e.g., the second chord length of the splitter blade 1006).

FIG. 11E is an example fifth assembly 1150 including a trunnion 1152, a fan blade 1154, a first splitter blade 1156, and a second splitter blade 1158. The fifth assembly 1150 of FIG. 11E is similar to the second assembly 1112 of FIG. 11B. However, the fifth assembly 1150 of FIG. 11E includes an example third splitter blade 1160 laterally offset from fan blade 1154. In this example, the third splitter blade 1160 is similar to the first splitter blade 1156 and/or the second splitter blade 1158. For example, the third splitter blade 1160 includes a fourth thickness that is substantially the same as a thickness of the first splitter blade 1156 (e.g., the second thickness 1016 of the splitter blade 1006 of FIG. 10) or a thickness of the second splitter blade 1158 (e.g., the third thickness of the second splitter blade 1120 of FIG. 11B). Further, the second splitter blade 1158 is positioned between the third splitter blade 1160 and the fan blade 1154. In some examples, the third splitter blade 1160 is adjacent to the first splitter blade 1156. In some examples, the first splitter blade 1156 is positioned between the fan blade 1154 and the third splitter blade 1160.

From the foregoing, it will be appreciated that example systems, apparatus, articles of manufacture, and methods have been disclosed that provide example trunnions for mounting multiple blades. In particular, example trunnions disclosed herein can be used to mount a primary blade and one or more splitter blades. Certain trunnions disclosed herein one or more splitter spars laterally offset relative to a primary spar. Example trunnions disclosed herein include an outer sleeve in which to house bases of the spars and one or more inner sleeves to secure the bases of the spars relative to the trunnion. Certain trunnions disclosed herein include splitter spars extending from the outer sleeve. Certain trunnions disclosed herein include one or more dovetails slots for mounting dovetails of one or more splitter blades. Further aspects of the present disclosure are provided by the subject matter of the following clauses:

A variable pitch blade assembly comprising a trunnion defining a pitch axis, the trunnion including: a first sleeve defining a face of the trunnion; and a second sleeve within the first sleeve, the second sleeve including a pedestal and a column extending from the pedestal; a first spar for a fan blade, the first spar having a base portion and a mounting portion, the mounting portion protruding from the face of the trunnion, the base portion including an inner surface defining a bore, wherein the column of the second sleeve is disposed within the bore of the base portion, wherein the first sleeve, the second sleeve, and the first spar are coaxial with the pitch axis; and a second spar extending from the face of the trunnion, the second spar laterally offset relative to the first spar.

The variable pitch blade assembly of any preceding clause, wherein the second spar implements a splitter blade.

The variable pitch blade assembly of any preceding clause, wherein the second spar is integrally formed with the first sleeve.

The variable pitch blade assembly of any preceding clause, further including a splitter blade coupled to the second spar.

The variable pitch blade assembly of any preceding clause, further including a third spar, the first spar positioned between the second spar and the third spar.

The variable pitch blade assembly of any preceding clause, wherein the third spar is larger than the second spar.

The variable pitch blade assembly of any preceding clause, wherein the second spar and the third spar are asymmetrically located with respective to the first spar.

The variable pitch blade assembly of any preceding clause, wherein the trunnion further includes a third sleeve, the third sleeve disposed between the first sleeve and the base portion of the first spar.

The variable pitch blade assembly of any preceding clause, wherein the inner surface of the mounting portion of the first spar has a first cross-sectional profile, and wherein the column of the second sleeve has an outer surface having a second cross-sectional profile, the outer surface of the column abutting the inner surface of the first spar such that the second cross-sectional profile is aligned with the first cross-sectional profile.

A fan for a turbine engine, the fan comprising: a trunnion including: an outer sleeve having a first inner surface defining an interior and first transverse surface defining a face of the trunnion; and an inner sleeve having a column portion housed within the outer sleeve; a first spar for holding a fan blade, the first spar including a first base portion within the trunnion and a first mounting portion protruding from the face of the trunnion, the first base portion having a second inner surface defining a bore and a pitch axis, wherein the column portion of the inner sleeve is disposed within the bore; and a second spar extending from the face of the trunnion.

The fan of any preceding clause, wherein the second spar includes a second base portion and a second mounting portion, the second base portion abutting the first base portion of the first spar, and further including a spacer disposed between the first spar and the second spar proximate to the face of the trunnion to separate the first mounting portion and the second mounting portion.

The fan of any preceding clause, wherein the first spar has a first outer surface, the first outer surface spaced apart from the second inner surface of the first base portion to define a thickness of the first base portion.

The fan of any preceding clause, wherein the first outer surface of the first spar abuts the first inner surface of the outer sleeve of the trunnion.

The fan of any preceding clause, wherein the trunnion further includes an intermediate sleeve disposed between the outer sleeve and the first spar, the intermediate sleeve having a third inner surface that abuts the first outer surface of the first spar, the intermediate sleeve having a second outer surface that abuts the first inner surface of the outer sleeve.

The fan of any preceding clause, wherein the second spar includes a second base portion and a second mounting portion, the second mounting portion extending from the face of the trunnion, the second base portion disposed between the outer sleeve of the trunnion and the intermediate sleeve of the trunnion to secure the second mounting portion relative to the trunnion.

The fan of any preceding clause, wherein the trunnion includes a fastener disposed between the intermediate sleeve and the outer sleeve, the fastener to couple the intermediate sleeve to the outer sleeve.

The fan of any preceding clause, wherein the outer sleeve of the trunnion further includes a second surface opposite the first inner surface, a third annular surface extending between the first inner surface and the second surface, and a fourth annular surface opposite the third annular surface, the second surface defining a base of the trunnion.

The fan of any preceding clause, wherein the first base portion of the first spar diverges outward relative to the pitch axis to form a lip, the lip closer to the base of the trunnion than the face of the trunnion.

The fan of any preceding clause, wherein the lip is linear such that the lip is angled relative to the pitch axis.

The fan of any preceding clause, wherein the lip includes curvature.

A turbine engine, the turbine engine comprising: a first spar defining a pitch axis, the first spar having a first base and a first mount; and a second spar laterally offset relative to the pitch axis; and a rotatable trunnion to mount the first spar and the second spar, the rotatable trunnion including: an outer sleeve, the outer sleeve surrounding the first base of the first spar; and an inner sleeve within the outer sleeve, the inner sleeve including a column disposed within a borehole recessed into a distal surface of the first base of the first spar, wherein the first spar and the second spar extend radially outward from the outer sleeve.

The turbine engine of any preceding clause, wherein the inner sleeve includes a pedestal from which the column extends, and wherein the first spar has a cross-sectional area that increases proximate to the pedestal of the inner sleeve.

The turbine engine of any preceding clause, further including: a fan blade extending from the first mount of the first spar; and a splitter blade extending from a second mount of the second spar.

The turbine engine of any preceding clause, further including a circumferential hub, the rotatable trunnion disposed radially inward relative to the circumferential hub, the fan blade and the splitter blade extending radially outward from the circumferential hub.

The turbine engine of any preceding clause, further including an actuator operably coupled to the rotatable trunnion, the actuator configured to cause the rotatable trunnion to rotate to adjust a first pitch of the fan blade and a second pitch of the splitter blade.

A turbine engine comprising means for rotating, the means for rotating including means for housing; and first means for securing located within the means for housing; first means for mounting having a first portion located within the means for housing and a second portion extending outward from the means for housing, first means for supporting at least partially disposed within the first portion of the first means for mounting; and second means for mounting, the second means for mounting laterally offset relative to the first means for mounting.

The turbine engine of any preceding clause, wherein the second means for mounting includes a third portion located within the means for housing and a fourth portion extending outward from the means for housing.

The turbine engine of any preceding clause, wherein the second means for mounting includes a dovetail slot recessed into the means for housing.

The turbine engine of any preceding clause, further including means for spacing disposed between the first means for mounting and the second means for mounting.

The turbine engine of any preceding clause, further including: a fan blade coupled to the first means for mounting; and a splitter blade coupled to the second means for mounting.

The turbine engine of any preceding clause, further including a circumferential hub, the means for rotating disposed radially inward relative to the circumferential hub, the fan blade and the splitter blade extending radially outward from the circumferential hub.

The turbine engine of any preceding clause, further including an actuator operably coupled to the means for rotating, the actuator configured to cause the means for rotating to rotate to adjust a first pitch of the fan blade and a second pitch of the splitter blade.

A fan comprising: a trunnion including (a) an outer sleeve having a first surface defining a face of the trunnion, the outer sleeve including a first dovetail slot recessed into the first surface and (b) a first inner sleeve having a column; and a spar having a tubular portion housed within the outer sleeve and a mounting portion protruding from the face of the trunnion, the column of the trunnion disposed within the tubular portion of the spar.

The fan of any preceding clause, further including a retention cap positioned adjacent to the face of the trunnion.

The fan of any preceding clause, further including a first bumper and a second bumper, the first and second bumpers positionable within the first dovetail slot, the first bumper having a first length, the second bumper having a second length.

The fan of any preceding clause, wherein the first length is larger than the second length.

The fan of any preceding clause, wherein the first length is equal to the second length.

The fan of any preceding clause, further including a second dovetail slot.

The fan of any preceding clause, further including: a fan blade coupled to the spar; and a splitter blade coupled to the trunnion via the first dovetail slot.

A fan for a turbine engine, the fan comprising: a first spar having a first fan blade; and a trunnion, the trunnion including: an outer sleeve having a first transverse surface, the outer sleeve including a first splitter blade extending from the first transverse surface; and an inner sleeve located within the outer sleeve, wherein the first spar includes a base disposed between the inner sleeve and the outer sleeve.

The fan of any preceding clause, wherein the trunnion includes an intermediate sleeve disposed between the base of the first spar and the outer sleeve.

The fan of any preceding clause, wherein the first spitter blade is integrally formed with the trunnion.

The fan of any preceding clause, wherein the first splitter blade is coupled to the trunnion by a dovetail slot.

The fan of any preceding clause, further including a second splitter blade extending from the first transverse surface of the trunnion, the first spar located between the first splitter blade and the second splitter blade.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A variable pitch blade assembly, the variable pitch blade assembly comprising:
    a trunnion defining a pitch axis, the trunnion including:
        a first sleeve defining a face of the trunnion; and
        a second sleeve within the first sleeve, the second sleeve including a pedestal and a column extending from the pedestal;
    a first spar for a fan blade, the first spar having a base portion and a mounting portion, the mounting portion protruding from the face of the trunnion, the base portion including a first inner surface defining a bore, wherein the column of the second sleeve is disposed within the bore of the base portion, wherein the first sleeve, the second sleeve, and the first spar are coaxial with the pitch axis; and
    a second spar extending from the face of the trunnion, the second spar laterally offset relative to the first spar.

2. The variable pitch blade assembly of claim 1, wherein the second spar implements a splitter blade.

3. The variable pitch blade assembly of claim 1, wherein the second spar is integrally formed with the first sleeve.

4. The variable pitch blade assembly of claim 1, further including a splitter blade coupled to the second spar.

5. The variable pitch blade assembly of claim 1, further including a third spar, the first spar positioned between the second spar and the third spar.

6. The variable pitch blade assembly of claim 5, wherein the third spar is larger than the second spar.

7. The variable pitch blade assembly of claim 5, wherein the second spar and the third spar are asymmetrically located with respect to the first spar.

8. The variable pitch blade assembly of claim 1, wherein the trunnion further includes a third sleeve, the third sleeve disposed between the first sleeve and the base portion of the first spar.

9. The variable pitch blade assembly of claim 1, wherein a second inner surface of the mounting portion of the first spar has a first cross-sectional profile, and wherein the column of the second sleeve has an outer surface having a second cross-sectional profile, the outer surface of the column abutting the second inner surface of the mounting portion of the first spar such that the second cross-sectional profile is aligned with the first cross-sectional profile.

10. A fan for a turbine engine, the fan comprising:
    a trunnion including:
        an outer sleeve having a first inner surface defining an interior and first transverse surface defining a face of the trunnion; and
        an inner sleeve having a column portion housed within the outer sleeve;
    a first spar for holding a fan blade, the first spar including a first base portion within the trunnion and a first mounting portion protruding from the face of the trunnion, the first base portion having a second inner surface defining a bore and a pitch axis, wherein the column portion of the inner sleeve is disposed within the bore; and
    a second spar extending from the face of the trunnion.

11. The fan of claim 10, wherein the second spar includes a second base portion and a second mounting portion, the second base portion abutting the first base portion of the first spar, and further including a spacer disposed between the first spar and the second spar to separate the first mounting portion and the second mounting portion.

12. The fan of claim 10, wherein the first spar has a first outer surface, the first outer surface spaced apart from the second inner surface of the first base portion to define a thickness of the first base portion.

13. The fan of claim 12, wherein the first outer surface of the first spar abuts the first inner surface of the outer sleeve of the trunnion.

14. The fan of claim 12, wherein the trunnion further includes an intermediate sleeve disposed between the outer sleeve and the first spar, the intermediate sleeve having a third inner surface that abuts the first outer surface of the first spar, the intermediate sleeve having a second outer surface that abuts the first inner surface of the outer sleeve.

15. The fan of claim 14, wherein the second spar includes a second base portion and a second mounting portion, the second mounting portion extending from the face of the trunnion, the second base portion disposed between the outer sleeve of the trunnion and the intermediate sleeve of the trunnion to secure the second mounting portion relative to the trunnion.

16. The fan of claim 14, wherein the trunnion includes a fastener disposed between the intermediate sleeve and the outer sleeve, the fastener to couple the intermediate sleeve to the outer sleeve.

17. The fan of claim 10, wherein the outer sleeve of the trunnion further includes a second surface opposite the first inner surface, a third annular surface extending between the first inner surface and the second surface, and a fourth annular surface opposite the third annular surface, the second surface defining a base of the trunnion, and wherein the first base portion of the first spar diverges outward relative to the pitch axis to form a lip, the lip closer to the base of the trunnion than the face of the trunnion.

* * * * *